United States Patent
Nomichi et al.

(10) Patent No.: US 8,752,807 B2
(45) Date of Patent: Jun. 17, 2014

(54) SEAT BLOCK AND VALVE DEVICE

(75) Inventors: Kaoru Nomichi, Ono (JP); Yutaka Suzuki, Kobe (JP); Makoto Ninomiya, Kobe (JP); Yuko Funakubo, Akashi (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 907 days.

(21) Appl. No.: 11/817,909

(22) PCT Filed: Feb. 28, 2006

(86) PCT No.: PCT/JP2006/303740
§ 371 (c)(1),
(2), (4) Date: Nov. 13, 2008

(87) PCT Pub. No.: WO2006/095604
PCT Pub. Date: Sep. 14, 2006

(65) Prior Publication Data
US 2009/0065727 A1 Mar. 12, 2009

(30) Foreign Application Priority Data
Mar. 10, 2005 (JP) .................. 2005-067512

(51) Int. Cl.
*F16K 1/42* (2006.01)
(52) U.S. Cl.
USPC ........... 251/174; 251/332; 251/333; 251/337; 251/359
(58) Field of Classification Search
USPC ........ 251/359, 337, 174, 332–334; 267/140.2
See application file for complete search history.

(56) References Cited

U.S. PATENT DOCUMENTS

| 969,803 | A | * | 9/1910 | Pollock, Thomas | ..... 137/630.22 |
| 3,118,659 | A | | 1/1964 | Paulsen | |
| 3,583,426 | A | * | 6/1971 | Feres | ..... 251/333 |
| 3,646,969 | A | * | 3/1972 | Stampfli | ..... 251/174 |
| 3,960,364 | A | * | 6/1976 | Hargrave | ..... 251/332 |
| 4,094,314 | A | | 6/1978 | Le Cornec | |
| 4,711,435 | A | * | 12/1987 | Harris et al. | ..... 137/493 |

(Continued)

FOREIGN PATENT DOCUMENTS

| DE | 2629083 | 1/1977 |
| GB | 191108159 | 0/1912 |

(Continued)

OTHER PUBLICATIONS

International Search Report for Application No. PCT/JP2006/303740, dated Apr. 19, 2006.
Office Action for Canadian Patent Application No. 2,599,779, dated Jan. 28, 2011.

*Primary Examiner* — John Bastianelli
(74) *Attorney, Agent, or Firm* — Marshall, Gerstein & Borun LLP

(57) ABSTRACT

A seat block capable of maintaining a well-fitted state of a seat portion in a simple and reliable manner regardless of use conditions. A seat portion base body (43) is provided in a housing (67) provided with a valve passage (66) and allows a piston (28) for opening and closing a valve passage (66) to be pressed on the seat portion base body (43). A spring member (23) applies an elastic force to the seat portion base body (43) such that the elastic mechanism (23) cooperates with the housing (67) to retain the seat portion base body (43).

8 Claims, 12 Drawing Sheets

(56) References Cited

U.S. PATENT DOCUMENTS

| | | | |
|---|---|---|---|
| 4,815,699 A * | 3/1989 | Mueller | 251/333 |
| 5,118,086 A * | 6/1992 | Stevenson et al. | 267/141.1 |
| 5,580,031 A * | 12/1996 | Lorch | 251/359 |
| 5,868,167 A * | 2/1999 | Miki et al. | 251/129.16 |
| 6,067,946 A * | 5/2000 | Bunker et al. | 251/63.6 |
| 6,491,059 B2 * | 12/2002 | Kajitani | 251/337 |
| 6,491,189 B2 * | 12/2002 | Friedman | 251/339 |
| 6,755,166 B2 * | 6/2004 | Chang et al. | 251/129.07 |
| 2002/0014731 A1 * | 2/2002 | Palinkas | 267/276 |
| 2003/0122293 A1 * | 7/2003 | Akhtar et al. | 267/36.1 |
| 2004/0061412 A1 * | 4/2004 | Ozawa et al. | 310/239 |

FOREIGN PATENT DOCUMENTS

| | | |
|---|---|---|
| GB | 544524 | 4/1942 |
| JP | SHO 46-15909 | 6/1971 |
| JP | SHO 56-144864 | 10/1981 |
| JP | HEI 2-67175 | 5/1990 |
| JP | 08-261336 | 10/1996 |
| JP | 11-030279 | 2/1999 |
| JP | 2005-023975 | 1/2005 |
| NL | 7509017 | 2/1976 |

* cited by examiner

SEAT BLOCK AND VALVE DEVICE

TECHNICAL FIELD

The present invention relates to a seat block on which a valve body for opening and closing a valve passage is pressed, and a valve device comprising the same.

BACKGROUND ART

In recent years, a pressure-reducing valve for reducing a pressure of a fluid flowing in a flow passage, and an on-off valve for opening and closing the flow passage to control the fluid flowing in the flow passage have been practiced.

FIG. 10 is a cross-sectional view schematically showing a pressure-reducing valve 2 including a seat portion 1 according to a first prior art. FIG. 11 is an enlarged cross-sectional view showing the seat portion 1. The pressure-reducing valve 2 comprises a housing 3, a piston 4, the seat portion 1, and a spring member 5. The housing 3 is provided with a primary port 6 and a secondary port 7. The cylindrical piston 4 is displaceably inserted into the housing 3 in an axial direction of the housing 3. In the piston 4, an intermediate portion and a first end portion in the axial direction are retained in the housing and a second end portion in the axial direction is faced to the primary port 6. A connecting hole 8 is provided in the piston 4 to connect the primary port 6 to the secondary port 7. A valve body element 9 of a circularly annular shape is provided at a second axial end portion of the piston 4 so as to protrude in the axial direction. The seat portion 1 on which the valve body element 9 is pressed is fixedly attached to the housing 3 so as to surround the primary port 6. The valve body element 9 and the seat portion 1 form an orifice 10. The orifice 10 separates an interior of the housing 3 into a primary-pressure chamber 11 connected to the primary port 6 and a secondary-pressure chamber 12 connected to the secondary port 7. The piston 4 is provided with a spring member 5. The spring member 5 applies a spring force to the piston 4 in a first axial direction. The pressure-reducing valve 2 reduces a pressure of the fluid supplied to the primary port 6 by flowing it through the orifice 10 and outputs the operative fluid from the secondary port 7.

FIG. 12 is an enlarged view showing a seat portion 1A according to a second prior art. The seat portion 1A is provided at the pressure-reducing valve 2. The seat portion 1A is fitted to the housing 3 in such a manner that the seat portion 1A surrounds the primary port 6 and the valve body element 9 can be pressed thereon (for example, see patent document 1).

FIG. 13 is an enlarged view showing a seat portion 1B according to a third prior art. The seat portion 1B is provided at the pressure-reducing valve 2. The seat portion 1B is fitted to the housing 3 in such a manner that the seat portion 1B surrounds the primary port 6 and the valve body element 9 can be pressed thereon. The seat portion 1B is retained by cooperation of a fixing member 13 made of a metal material and the housing 3.
Patent document 1: Japanese Laid-Open Patent Application Publication No. 2005-23975

DISCLOSURE OF THE INVENTION

Problems to be Solved by the Invention

In the first prior art, it is necessary to fixedly attach the seat portion 1 to the housing 3 by, for example, bonding the seat portion 1 to the housing 3. When fixedly attaching the seat portion 1 to the housing 3 by bonding the seat portion 1, the following problems arise. (1) Since it is necessary to sufficiently degrease and dry a bonded surface region, the number of manufacturing steps increases. (2) The seat portion 1 must be bonded with a sufficient bonding strength.

Since the seat portion 1A of the second prior art is merely fitted to the housing 3, the seat portion 1A is displaced relative to the housing 3. For this reason, the position in which the piston 4 is pressed on the seat portion 1A changes every time opening and closing operation occurs, causing the valve body element 9 to contact in a different position, i.e., causing a change in the position in which the valve body element 9 is pressed on the seat portion 1A. Due to this change, a fitted state between the seat portion 1A and the valve body element 9 degrades, and as a result, the fluid leaks from the primary-pressure chamber 11 to the secondary-pressure chamber 12 even when the piston 4 is pressed on the seat portion 1A to close the orifice 10.

In the third prior art, since the seat portion 1B made of, for example, a synthetic resin material and the fixing member 13 made of a metal material are significantly different in heat expansion coefficients, the following problems will arise. (1) The thermal contraction with temperature change causes a clearance between the seat portion 1B and the fixing member 13. Thereby, an unstably fixed state of the seat portion 1B with respect to the fixing member 13 occurs. The unstably fixed state causes a change in the position in which the valve body element 9 is pressed on the seat portion 1B. (2) Even when attempt is made to retain the seat portion 1B for a long time period by the fixing member 13 while preventing the clearance between them, the seat portion 1B is degraded with lapse of time, i.e., permanent set in fatigue occurs. The permanent set in fatigue causes a clearance between the fixing member 13 and the seat portion 1B, causing the degradation of the fitted state of the seat portion 1B. This causes a change in the position where the valve body element 9 is pressed on the seat portion 1B. Due to the change in the position of the valve body element 9, the fluid leaks from the primary-pressure chamber 11 into the secondary-pressure chamber 12 even through the orifice 10 is closed, as in the case of the seat portion 1A or the second prior art.

An object of the present invention is to provide a seat block capable of maintaining a well-fitted state of a seat portion in a simple and reliable manner irrespective of use conditions.

Means for Solving the Problems

The present inventions provides a seat block comprising a seat portion base body provided in a housing provided with a valve passage and allows at least one valve body for opening and closing the valve passage to be pressed on the seat portion base body; and an elastic mechanism for applying an elastic force to the seat portion base body such that the elastic mechanism cooperates with the housing to retain the seat portion base body.

The elastic mechanism may be configured to apply to the seat portion base body the elastic force against a pressing force applied from the valve body pressed on the seat portion base body or from the fluid.

The elastic mechanism may include a spring mechanism.

The spring mechanism may be a non-linear spring mechanism with a small spring constant which is configured to gain a stable load with respect to displacement.

The present invention provides a valve device comprising the above described seat block.

Effects of the Invention

In accordance with the present invention, the seat portion base body on which at least one valve body for opening and closing the valve passage is pressed is provided in the housing provided with the valve passage. The seat portion base body is retained between the elastic mechanism and the housing. This makes it easy to mount the seat portion base body and makes it possible to reduce the number of manufacturing steps as compared to the prior art seat block. That is, the seat portion base body is retained by the cooperation of the elastic mechanism and the housing under the elastic force being applied from the elastic mechanism. Therefore, in accordance with the present invention, bonding work required in the first prior art becomes unnecessary, and thus the number of manufacturing steps is reduced. As a result, a manufacturing cost can be reduced. Since the seat portion base body is retained under the elastic force being applied, relative displacement with respect to the housing can be suppressed, and unstably fixed state can be suppressed, even when its processing precision is low. Therefore, well-fitted state of the seat portion can be ensured without improving processing precision of the seat portion base body. As a result, a manufacturing cost can be reduced.

Since the relative displacement of the seat portion base body with respect to the housing can be suppressed by the elastic force applied from the elastic mechanism, a change in the position of the seat portion base body which may occur in every opening and closing operation in the prior art, can be suppressed. This makes it possible to suppress a change in the position of the valve body with respect to the seat block. Therefore, it becomes possible to suppress degradation of the fitted state between the valve body and the seat portion base body which will cause the fluid to leak to downstream side. The seat portion base body is retained under the elastic force being applied from the elastic mechanism. Therefore, even if the seat portion base body and the housing are thermally contracted, the elastic mechanism applies the elastic force to the seat portion base body to retain the seat portion base body in the seat block. In other words, the electric mechanism is capable of absorbing the thermal contraction of the seat portion base body and the housing. This makes it possible to suppress unstably fixed state of the seat portion base body with respect to the housing which may be caused by the thermal contraction. As described above, the seat block is capable of reducing the number of manufacturing steps, of preventing a change in the position of the valve body and of maintaining a well-fitted state of the seat portion in a simple and reliable manner, irrespective of use conditions.

In accordance with the present invention, the elastic mechanism applies to the seat portion base body the elastic force against the pressing force applied from the valve body to be pressed on the seat portion base body or from the fluid. This makes it possible to provide the force against the pressing force applied to the seat portion base body when the valve body is pressed on the seat portion base body. Therefore, it becomes possible to suppress the relative displacement of the seat portion base body with respect to the housing, when the valve body is pressed on the seat portion base body.

In accordance with the present invention, the elastic mechanism includes the spring mechanism. This can serve as the elastic mechanism for applying the elastic force to the seat portion base body.

In accordance with the present invention, the spring mechanism is a non-linear spring mechanism with a small spring constant. Since the spring constant of the spring mechanism is small, change in the elastic force with respect to a displacement amount is small. Thereby, a stable elastic force can be applied to the seat portion base body even when the processing precision of the components is low or deformation of the seat portion base body occurs.

The present invention can provide a valve device including a seat block which is capable of reducing the number of manufacturing steps of the seat block, of suppressing degradation of the fitted state between the seat portion base body and the valve body when the valve passage is closed, and of absorbing the thermal contraction of the seat portion base body and the housing.

Now, several embodiments for carrying out the present invention will be described with reference to the drawings. Throughout the embodiments, the same reference numbers are used to identify corresponding components which have been already described in a preceding embodiment and therefore will not be described repetitively. When only a part of the components is described, it is described on the premise that the other parts are the same as those previously described. In addition to the combination described in each embodiment, the embodiments may be partially combined so long as that partial combination does not particularly arise any problems The above features of the invention will more fully be apparent from the following detailed description with accompanying drawings.

BEST MODE FOR CARRYING OUT THE INVENTION

Figure 1:
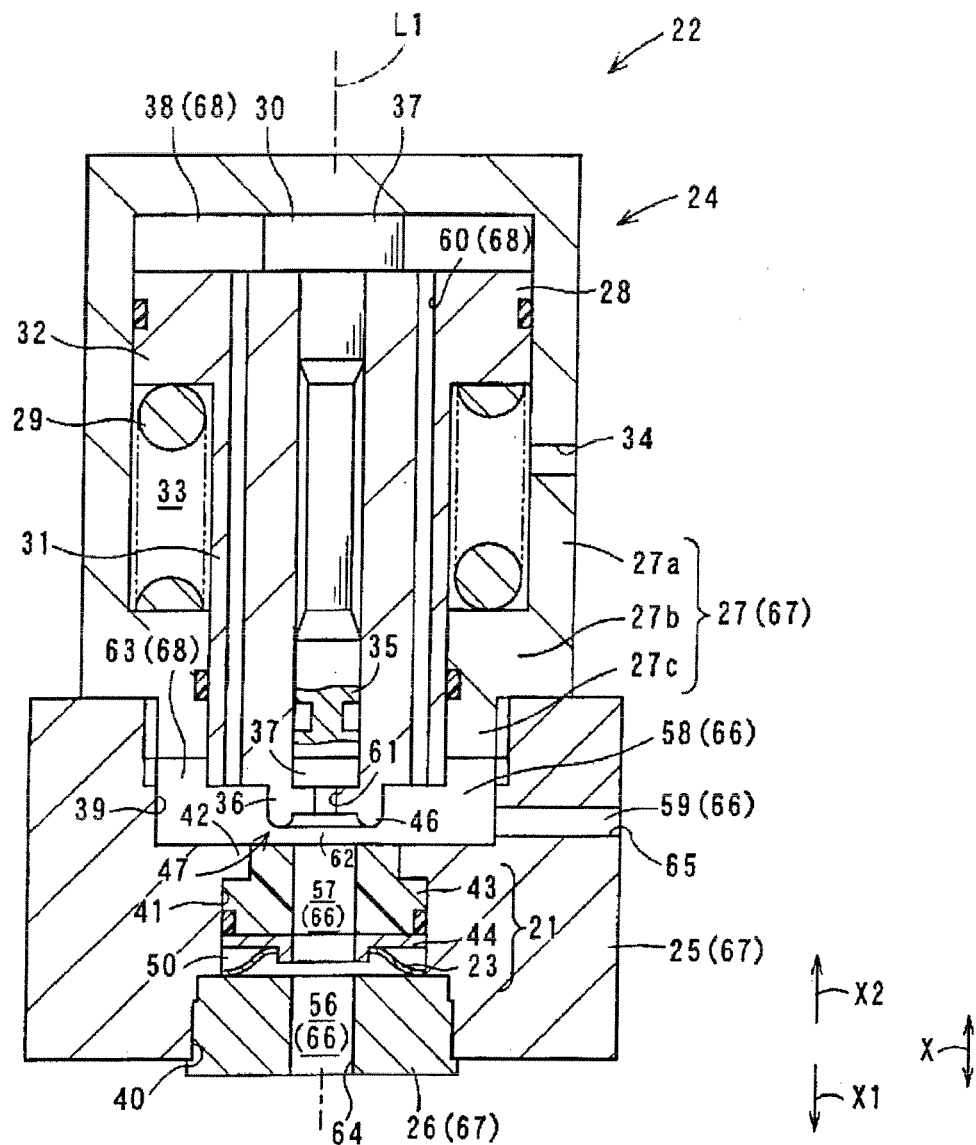
FIG. 1 is a cross-sectional view showing a valve device 22 including a seat block 21 according to a first embodiment of the present invention.
Figure 2:
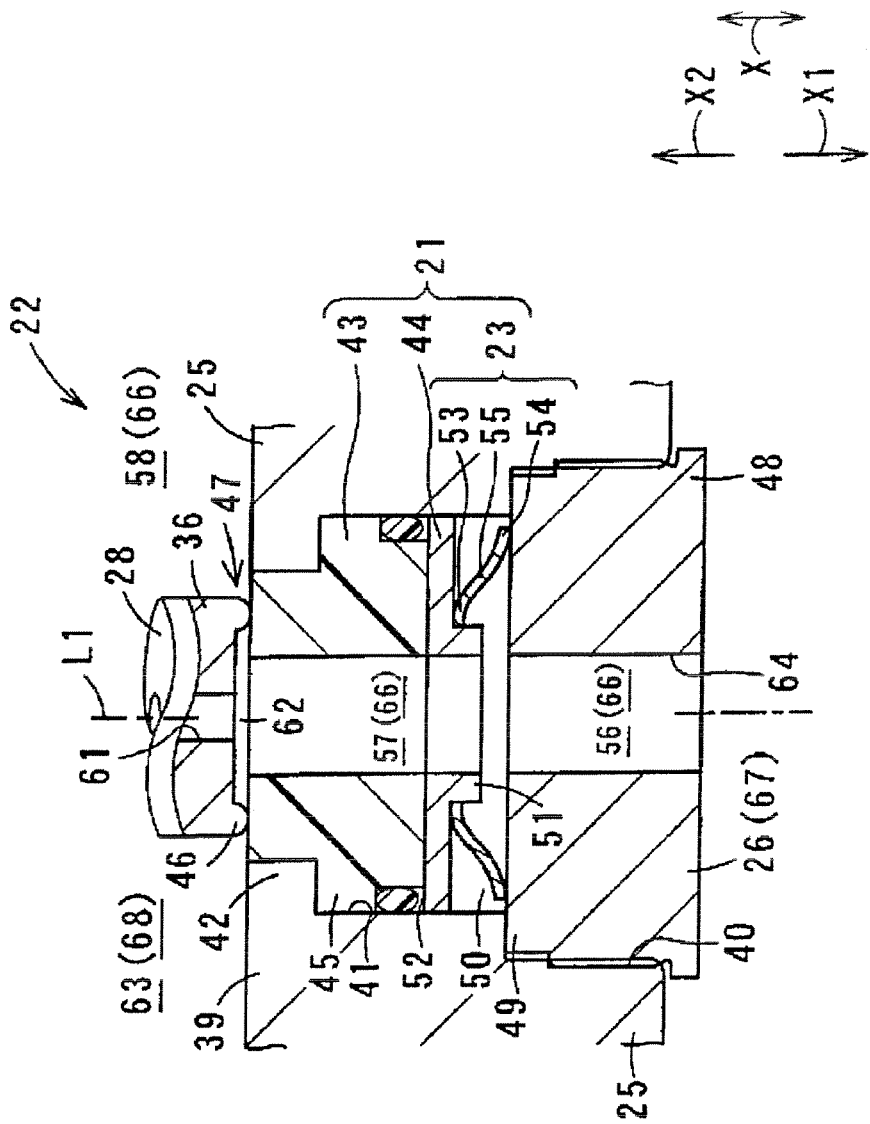
FIG. 2 is an enlarged cross-sectional view of the seat block 21.
Figure 3:
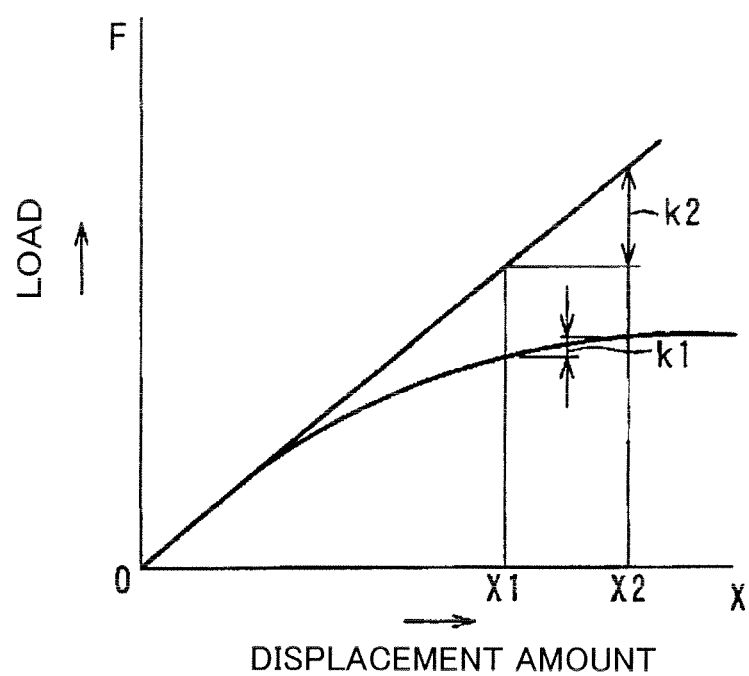
FIG. 3 is a graph showing a characteristic of a spring member 23.

FIG. 1 is a cross-sectional view showing a valve device 22 including a seat block 21 according to a first embodiment of the present invention. FIG. 2 is an enlarged cross-sectional view of the seat block 21. FIG. 3 is a graph showing a characteristic of a spring member 23. The valve device 22 is provided in a flow passage and is a pressure-reducing valve device which reduces a pressure of a fluid such as a gas supplied, and outputs the fluid. The valve device 22 includes a pressure-reducing valve portion 24, a seat block housing 25, a seat block 21, and a fixing member 26. The valve device 22 is constituted along a predetermined reference axis L1 as a reference. One of directions parallel to the reference axis L1 is referred to as a first axial direction X1 and the other direction parallel to the reference axis L1 is referred to as a second axial direction X2. The axes of the pressure-reducing valve portion 24, the seat block housing 25, and the seat block 21 substantially conform to the reference axis L1. The term "substantially conform to" means to include "conform to."

The pressure-reducing valve body 24 includes a pressure-reducing valve housing 27, a piston 28, a pressure-reducing valve spring member 29, and a rod 30 which are disposed so that their axes substantially conform to the reference axis L1. The pressure-reducing valve housing 27 includes a pressure-reducing valve housing body 27a, an inward flange portion 27b, and an opening end portion 27c. The pressure-reducing valve housing body 27a is formed in a substantially bottomed cylindrical shape. The term "substantially bottomed cylindrical shape" means to include "bottomed cylindrical shape." An inward flange portion 27b is formed on an opening of the pressure-reducing valve housing body 27a so as to protrude radially inward over an entire circumference thereof. The opening end portion 27c is formed at an inner peripheral edge of the inward flange portion 27b so as to protrude over an entire circumference thereof, in a direction away from the pressure-reducing housing body 27a, i.e., in the first axial direction X1. The inward flange portion 27b and the opening end portion 27c have inner wall portions which are substantially coplanar with each other. The term "substantially coplanar" means to include "coplanar." A male thread is formed on the outer peripheral region of the opening end portion 27c.

The piston 28 includes a piston portion 31 and a piston body 32. The piston portion 31 is formed in a substantially bottomed cylindrical shape. The piston body 32 of a flange shape is formed on an opening of the piston portion 31 so as to protrude radially outward. The piston portion 31 is retained in the pressure-reducing valve housing 27 slidably in the first axial direction X1 and in the second axial direction X2 (hereinafter referred to as axial direction X) so that a clearance between the piston portion 31 and inner surface regions of the inward flange portion 27b and the opening end portion 27c is sealed. The piston body 32 is retained slidably in the axial direction X so that a clearance between the piston body 32 and the inner wall face portion of the pressure-reducing valve housing body 27a is sealed. The piston portion 31, the piston body 32, the pressure-reducing valve housing body 27a, and the inward flange portion 27b define a pressure-reducing valve spring accommodating space 33 of a substantially circularly annular shape. The term "substantially circularly annular" means to include "circularly annular." A pressure-reducing valve spring member 29 is accommodated in the pressure-reducing valve spring accommodating space 33. The pressure-reducing valve spring member 29 is, for example, a compressive coil spring, and is externally mounted to the piston portion 31. A first axial end portion and a second axial end portion of the pressure-reducing valve spring member 29 contact the piston body 32 and the inward flange portion 27b, respectively. The pressure-reducing valve spring member 29 applies an elastic force to the piston 28 in the second axial direction X2. An atmosphere opening hole 34 is formed in the pressure-reducing valve housing 27a. The pressure-reducing spring accommodating space 33 opens to atmosphere through the atmosphere opening hole 34.

The rod 30 is formed in a substantially cylindrical shape and its large part is inserted into the piston 28. A bottom portion 36 of the piston portion 31 is disposed close to and away from a first axial end portion 35 of the rod 30. The piston 28 is displaceably retained in an inner wall portion of the piston 28 in a sealed state. A first axial end portion 35 of the rod 30 and the bottom portion 36 of the piston portion 31 define a back-pressure chamber 37. A second axial end portion 37 of the rod 30 is formed in a flange shape slightly protruding radially outward over the entire circumference. The second axial end portion 37 of the rod 30 protrudes from an opening of the piston 28 in the second axial direction X2. The piston 28, the pressure-reducing valve housing body 27a, and the outer peripheral surface portion of the second axial end portion 37 define a space 38 of a substantially circularly annular shape.

The seat block housing 25 is provided with a pressure-reducing valve portion threaded engagement concave portion 39, a fixing member threaded engagement concave portion 40, and a seat block retaining portion 41. The pressure-reducing valve portion threaded engagement concave portion 39 is formed at a region of the seat block housing 25 on the second axial direction X2 side and opens in the second axial direction X2. The pressure-reducing valve portion threaded engagement concave portion 39 is formed to extend along the reference axis L1. A female thread is formed on the inner peripheral region of the pressure-reducing valve portion threaded engagement concave portion 39, and the opening end portion 27c is threadedly engaged with the female thread. The fixing member threaded engagement concave portion 40 is formed at a region of the seat block housing 25 on the first axial direction X1 side and opens in the first axial direction X1. The fixing member threaded engagement concave portion 40 is formed to extend along the reference axis L1. A female thread is threaded on the inner peripheral region of the fixing member threaded engagement concave portion 40. The seat block retaining portion 41 connects the pressure-reducing valve portion threaded engagement concave portion 39 to the fixing member threaded engagement concave portion 40. The seat block retaining portion 41 is formed to extend along the reference axis L1. The seat block retaining portion 41 has a diameter smaller than those of the pressure-reducing valve portion threaded engagement concave portion 39 and the fixing member threaded engagement concave portion 40 in order to retain the seat block 21. An inward flange portion 42 is formed at the seat block retaining portion 41 to restrict displacement of the seat block 21 in the second axial direction X2. The inward flange portion 42 is formed at an opening on the second axial direction X2 side to protrude radially inward over an entire circumference.

The seat block 21 includes a seat portion base body 43, a spring receiver portion 44, and the spring member 23. The seat portion base body 43 is made of, for example, rubber or synthetic resin. The seat portion base body 43 is formed in a substantially cylindrical shape. An outward flange portion 45 is formed at a first axial end portion of the seat portion base body 43 so as to protrude radially outward over an entire circumference thereof. The seat portion base body 43 is inserted into the seat block retaining portion 41 such that the outward flange portion 45 and the inward flange portion 42 are engaged with each other and is disposed so that the piston 28 can be pressed thereon. The seat portion base body 43 is retained in such a manner that a clearance between the outer peripheral portion of the outward flange portion 45 and the inner peripheral portion of the seat block retaining portion 41 is sealed. The outward flange portion 45 of the seat portion base body 43 is disposed on the first axial direction X1 side.

The axis of the seat portion base body 43 substantially conforms to the reference axis L1.

A valve body element 46 of a substantially circularly annular shape is formed at the piston portion 31 so as to protrude in the first axial direction X1 from the bottom portion 36 faced to the seat portion base body 43. The valve body element 46 presses the seat portion base body 43 in an annular shape in a state where the piston 28 is pressed on the seat portion base body 43. The valve body element 46 cooperates with the seat portion base body 43 to form an orifice 47 of a substantially circularly annular shape.

The fixing member 26 is formed in a substantially cylindrical shape. The term "substantially cylindrical shape" means to include "cylindrical shape." A male thread is formed on an intermediate axial portion of the fixing member 26 and is threadedly engaged with the fixing member threaded engagement concave portion 40. A first axial end portion 49 of the fixing member 26 on the first axial direction X1 side contacts the seat block retaining portion 41. The axis of the fixing member 26 substantially conforms to the reference axis L1. The fixing member 26, the seat portion base body 43, and the seat block retaining portion 41 form a spring accommodating space 50 of a substantially cylinder hole shape. The term "substantially cylinder hole shape" means to include "cylinder hole shape."

The spring receiver portion 44 is formed in a substantially circularly annular shape. A spring insertion element 51 is formed at an inner peripheral edge of the spring receiver portion 44 so as to protrude in the first axial direction X1 over an entire circumference thereof. The spring receiver portion 44 is disposed in the spring accommodating space 50. The spring receiver portion 44 is inserted into the spring accommodating space 50 such that its outer peripheral portion is internally fitted to the seat block retaining portion 41. The axis of the spring receiver portion 44 substantially conforms to the reference axis L1. A surface portion 52 of the spring receiver portion 44 on the second axial direction X2 side contacts the outward flange portion 45 of the seat portion base body 43.

The spring member 23, which is an elastic mechanism, includes a first seat portion 53, a second seat portion 54, and an inclined portion 55. The first seat portion 53 is formed in a substantially circularly annular shape. The second seat portion 54 is formed in a substantially circularly annular shape, and has an outer diameter and an inner diameter larger than an outer diameter of the first seat portion 53. The first seat portion 53 and the second seat portion 54 are arranged to be spaced apart from each other in the axial direction X such that their axes substantially conform to each other. The entire outer peripheral portion in the circumferential direction of the first seat portion 53 is coupled to the entire inner peripheral portion in the circumferential direction of the second seat portion 54 by the inclined portion 55. The inclined portion 55 is inclined radially inward in the second axial direction X2 from the second seat portion 54 and is connected to the first seat portion 53. The first seat portion 53, the second seat portion 54, and the inclined portion 55 are unitarily formed. A spring characteristic of the spring member 23 (hereinafter referred to as "spring characteristic") formed as described above and a spring characteristic of a coil spring (hereinafter referred to as "coil spring characteristic") are shown in FIG. 3. In FIG. 3, a vertical axis indicates a load in the axial direction X (hereinafter referred to as a load) and a horizontal axis indicates a displacement amount in the axial direction X (hereinafter referred to as a "displacement amount"). The spring characteristic shows non-linearity and the coil spring characteristic shows linearity. A spring constant k1 in a range $x1 \leq x \leq x2$ of the displacement amount of the spring member 23 is smaller than a spring constant k2 in the range of the coil spring. For this reason, the spring member 23 is able to gain a stable load which changes less with respect to displacement, as compared to linear springs such as the coil spring. In this embodiment, the spring member 23 is used in this range, for example.

The spring member 23 is accommodated in the spring accommodating space 50 so as to be elastically deformable. The first seat portion 53 contacts the spring receiver portion 44 and its inner peripheral portion is externally fitted to the spring insertion element 51. The second seat portion 54 contacts the fixing member 26. The axis of the spring member 23 substantially conforms to the reference axis L1. The spring member 23 is provided to be compressed by a displacement amount x from a free length H and applies to the seat portion base body 43 a spring force F in the second axial direction X2 via the spring receiver 44. The spring member 23 applies this spring force and cooperates with the inward flange portion 42 to retain the seat portion base body 43 between them. The spring member 23 is accommodated in the spring accommodating space 50 and applies the spring force F larger than a pressing force applied from the piston 28 and from the fluid to the seat portion base body 43. The spring receiver portion 44 is provided in such a manner that the spring insertion element 51 is spaced apart from the fixing member 26 to permit displacement of the spring receiver portion 44 in the axial direction X and deformation of the spring member 23.

A supply passage 56 is formed by the inner peripheral portion of the fixing member 26 and the valve hole 57 is formed by the inner peripheral regions of the seat portion base body 43 and the spring receiver portion 44. The valve hole 57 and the supply passage 56 are connected to each other via the spring accommodating space 50. The axes of the fixing member 26, the seat portion base body 43 and the spring receiver portion 44 substantially conform to the reference axis L1, and their inner peripheral portions are substantially coplanar with each other.

In a state where the pressure-reducing valve portion 24 is threadedly engaged, a pressure-reducing valve space 58 defined by the pressure-reducing valve portion 24 and the seat block housing 25 is formed inside the pressure-reducing valve portion threaded engagement concave portion 39. The pressure-reducing valve space 58 is connected to the valve hole 57. An output passage 59 is formed in the seat block housing 25 to connect the pressure-reducing valve space 58 to outside. The piston 28 has a piston passage 60 connecting the pressure-reducing valve space 58 to the space 38 and a connecting hole 61 connecting the pressure-reducing valve space 58 to the back-pressure chamber 37. The pressure-reducing valve space 58 has two regions separated by the orifice 47. To be specific, the pressure-reducing valve space 58 has a primary-pressure chamber 62 formed to be located radially inward of the orifice 47 and a secondary region 63 formed to be located radially outward of the orifice 47. The primary-pressure chamber 62 is connected to the primary port 64 which is an opening which opens outward in the supply passage 56. The secondary-pressure region 63 is connected to the secondary port 65 which is an opening which opens outward in the output passage 59. The supply passage 56, the valve hole 57, the pressure-reducing valve space 58, and the output passage 59 form a valve passage 66. The orifice 47 separates the interior of the housing 67 into the primary-pressure chamber 62 and a secondary-pressure chamber 68 including the secondary region 63, the piston passage 60 and the space 38. The housing 67 includes the pressure-reducing valve housing 27, the seat block housing 25, and the fixing member 26. The primary-pressure chamber 62 is connected to the back-pressure chamber 37 through the connecting hole 61.

Hereinafter, the operation of the valve device 22 constructed above will be described. When the fluid is supplied to the primary port 64, it flows into the primary-pressure chamber 62 through the supply passage 56 and the valve hole 57. The pressure of the fluid in the primary-pressure chamber 62 is reduced by being flowed in the orifice 47, and the fluid flows to the secondary-pressure chamber 68 and is output from the output passage 59. The fluid in the space 38 applies to the piston body 32 a secondary pressure against the spring force of the pressure-reducing valve spring member 29. When the secondary pressure becomes higher than the spring force of the pressure-reducing valve spring member 29, the piston 28 slides to close the valve passage 66, whereas when the secondary pressure becomes smaller than the spring force of the pressure-reducing valve spring member 29, the piston 28 slides to open the valve passage 66, thus controlling the secondary pressure of the fluid flowing from the primary-pressure chamber 62 to the secondary-pressure chamber 68. The primary pressure applied from the fluid in the primary-pressure chamber 62 to the piston 28 is cancelled by the fluid in the back-pressure chamber 37. In this manner, the valve device 22 reduces the pressure of the fluid supplied to the primary pressure chamber 62 and outputs the fluid from the secondary port 65.

Hereinbelow, effects provided by the seat block 21 and the valve device 22 will be described. In accordance with the seat block 21 of this embodiment, the seat portion base body 43 on which the piston 28 for opening and closing the valve passage 66 is pressed is provided in the seat block housing 25 provided with the valve passage 66. The seat portion base body 43 is retained between the spring member 23 and the seat block housing 25. This makes mounting of the seat portion base body 43 easier. As a result, the number of manufacturing steps can be reduced as compared to the prior art seat block. That is, the seat portion base body 43 is retained by the cooperation of the spring member 23 and the housing 67 under the spring force being applied from the spring member 23. In accordance with this invention, bonding work in the first prior art becomes unnecessary, and thus the number of manufacturing steps can be reduced. As a result, the manufacturing cost can be reduced. Since the seat portion base body 43 is retained under the spring force being applied, displacement of the seat portion base body 43 relative to the seat block housing 25 can be suppressed, and the unstably fixed state thereof can be suppressed, even when the processing precision is low. As a result, a well-fitted state of the seat portion can be ensured without improving processing precision of the seat block 21 and the seat block housing 25, and thus a manufacturing cost can be reduced.

Since the displacement of the seat portion base body 43 relative to the housing 67 can be suppressed by the spring force applied from the spring member 23, a change in the position of the seat portion base body 43, which takes place in every opening and closing operation in the prior art, can be suppressed. This makes it possible to suppress a change in the position of the valve body element 46 with respect to the seat block 21. Therefore, it becomes possible to avoid the fact that degradation of the fitted state between the valve body element 46 and the seat portion base body 43 occurs and thereby the fluid leaks to the downstream side, for example, from the primary-pressure chamber 62 to the secondary-pressure chamber 68. The seat portion base body 43 is retained under the spring force being applied from the spring member 23. Therefore, the seat block 21 is maintained in a condition where the spring member 23 applies the spring force to the seat portion base body 43 to retain the seat portion base body 43, even when the seat portion base body 43 and the seat block housing 25 are thermally contracted. In other words, the spring member 23 can absorb thermal contraction of the seat portion base body 43 and the housing 67. This makes it possible to suppress the unstably fixed state of the seat portion base body 43 with respect to the seat block housing 25, which may be caused by the thermal contraction. As described above, it is possible to achieve the seat block 21 which can reduce the number of manufacturing steps, prevent a change in the position of the seat portion base body 43, and simply and surely maintain the well-fitted state of the seat portion, irrespective of use conditions.

In accordance with the seat block 21 of this embodiment, the spring member 23 applies to the seat portion base body 43 the spring force against the pressing force of the piston 28 which is pressed thereon. Thus, the force against the pressing force applied from the piston 28 to the seat portion base body 43 can be applied from the spring member 23, when the piston 28 is pressed on the seat portion base body 43. This makes it possible to suppress displacement of the seat portion base body 43 with respect to the seat block housing 25, i.e., the unstably fixed state of the seat portion base body 43, when the piston 28 is pressed on the seat portion base body 43.

In accordance with the seat block 21 of this embodiment, the spring member 23 can serve as an elastic mechanism for applying the spring force to the seat portion base body 43.

In accordance with the seat block 21 of this embodiment, the spring member 23 is a non-linear spring member with a small spring constant k2. In the spring member 23, a change amount of the spring force F with respect to a displacement amount is small, because of the small spring constant k2. This makes it possible to apply a stable spring force F to the seat portion base body 43 even when processing precision of the parts is low and deformation of the seat portion base body 43 occurs.

In accordance with the seat block 21 of this embodiment, the spring member 23 is configured to press the seat portion base body 43. So, even when deformation of the seat portion base body 43 progresses with time, such deformation can be absorbed by the pressing operation of the spring member 23 with respect to the seat portion base body 43. As a result, the unstably fixed state of the seat portion base body 23 can be suppressed.

In accordance with the seat block 21 of this embodiment, since the spring constant k1 of the spring member 23 is smaller than the spring constant k2 of the coil spring and the change amount of the applied spring force with respect to the displacement amount is small. Thereby, the spring member 23 applies a desired spring force to the seat portion base body 43 with a small change amount even if the processing precision of the seat block 21 and the seat block housing 25 is low. So, processing precision of the seat block 21 and the seat block housing 25 may be low. As a result, a manufacturing cost of the valve device 22 can be reduced. Also, even when the seat portion base body 43 is deformed by thermal contraction or with time, the spring member 23 can apply a stable force to the seat portion base body 43.

In accordance with the seat block 21 of this embodiment, the spring receiver portion 44 is provided between the seat portion base body 43 and the spring member 23 so that a surface pressure based on the spring force of the spring member 23 to be applied to the seat portion base body 43 can be made uniform. For this reason, uneven contact of the seat portion base body 43 with the seat block housing 25 can be suppressed, and deformation of the seat portion base body 43 which may be partially pressed by the first seat surface 53 can be suppressed. Since the spring insertion element 51 is inserted into the spring member 23, the unstably fixed state of the spring member 23 can be suppressed, and uneven contact of the spring member 23 with respect to the spring receiver portion 44 can be suppressed. Since the spring member 23 is formed by the first seat portion 53, the second seat portion 54, and the inclined portion 55, it can be accommodated in the spring accommodating space 50 smaller than that for the prior art coil spring. As a result, the seat block 21 can be small-sized.

In accordance with the seat block 21 of this embodiment, since the spring receiver portion 44 and the fixing member 26 are spaced apart in the axial direction X, displacement of the spring receiver portion 44 in the axial direction X and elastic deformation of the spring member 23 in the axial direction X are permitted. This enables the spring member 23 to cushion the pressing force of the piston 28. As a result, damage to the seat block 21 and the fixing member 26 can be suppressed. Furthermore, since thermal contraction and thermal expansion of the seat portion base body 43 can be absorbed, the unstably fixed state due to the thermal contraction and damage due to the thermal expansion can be suppressed.

In accordance with the seat block 21 of this embodiment, since the spring member 23 contacts the fixing member 26, the spring force of the spring member 23 can be changed by changing a displacement amount of the fixing member 26 with respect to the seat block housing 25 in the axial direction X. In this manner, the spring member 23 is able to apply a desired spring force to the seat portion base body 43.

In accordance with the seat block 21 of this embodiment, the spring member 23 applies to the seat portion base body 43 the spring force larger than the pressing force applied from the piston 28 and from the fluid. This makes it possible to suppress displacement of the seat portion base body 43 which may be caused by the pressing force applied from the piston 28 and from the fluid. Therefore, a change in the position of the valve body element 46 with respect to the seat portion base body 43 can be suppressed every time the piston 28 is pressed on the seat portion base body 43, and degradation of the fitted state between them can be suppressed. By suppressing the degradation of the fitted state between them, it is possible to suppress flow of the fluid from the primary-pressure chamber 62 to the secondary-pressure chamber 68 in a state where the valve passage 66 is closed.

In accordance with the valve device 22 of this embodiment, the valve device 22 including the seat block 21 which is capable of reducing the number of manufacturing steps, of suppressing degradation of the fitted state between the seat portion base body 43 and the piston 28, and of absorbing the thermal contraction of the seat portion base body 43 and the housing 67.

Figure 4:
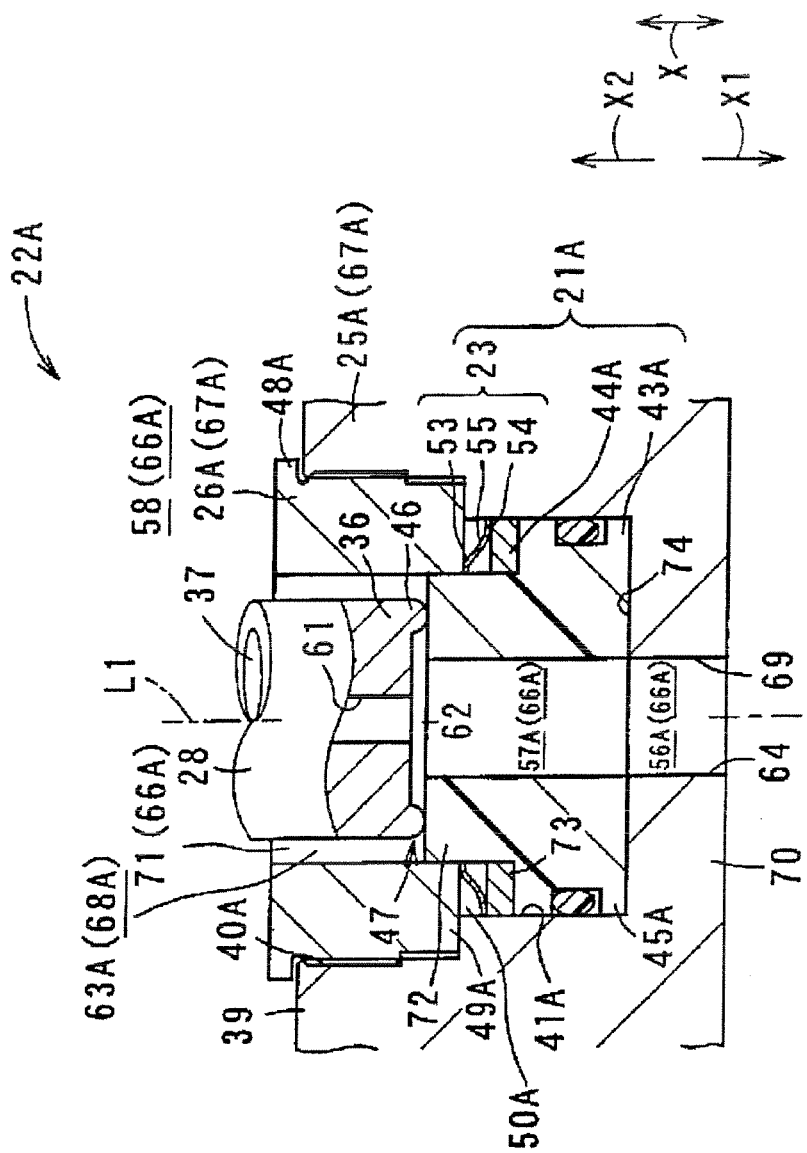
FIG. 4 is an enlarged cross-sectional view showing a seat block 21A according to a second embodiment of the present invention.

FIG. 4 is an enlarged cross-sectional view of a seat block 21A according to a second embodiment of the present invention. A valve device 22A of the second embodiment includes the pressure-reducing valve portion 24, a seat block housing 25A, the seat block 21A, and a fixing member 26A. The valve device 22A is similar in structure to the valve device 22 of the first embodiment. Therefore, a distinction between the valve device 22A of the second embodiment and the valve device 22 of the first embodiment will be described with reference to FIG. 1. In the valve device 22A, the same components as those of the valve device 22 are denoted by the same reference numbers and will not be further described.

The seat block housing 25A is provided with the pressure-reducing valve portion threaded engagement concave portion 39, a fixing member threaded engagement concave portion 40A, a seat block retaining portion 41A, a supply portion 69 and the output passage 59. The fixing member threaded engagement concave portion 40A is formed to extend in the axial direction X1 from the bottom portion of the pressure-reducing valve portion threaded engagement concave portion 39 and opens in the second axial direction X2. The fixing member threaded engagement concave portion 40A is formed to extend along the reference axis L1 and has a diameter smaller than that of the pressure-reducing valve portion threaded engagement concave portion 39. A female thread is formed on an inner peripheral region of the fixing member threaded engagement concave portion 40A. The seat block retaining portion 41A is formed to extend in the first axial direction X1 from the bottom portion of the fixing member threaded engagement concave portion 40A and opens in the second axial direction X2. The seat block retaining portion 41A is formed to extend along the reference axis L1 and has a diameter smaller than that of the fixing member threaded engagement concave portion 40A. The supply portion 69 penetrates in the second axial direction X2 along the reference axis L1 from a surface portion 70 of the seat block housing 25A on the first axial direction X1 side to the seat block retaining portion 41A. The supply portion 69 opens in the first axial direction X1 and connects the seat block retaining portion 41A to outside. The supply portion 69 has a diameter smaller than that of the seat block retaining portion 41A, and its inner peripheral region forms a supply passage 56A.

The seat block 21A includes a seat portion base body 43A, a spring receiver portion 44A, and the spring member 23. The seat portion base body 43A is made of, for example, rubber or synthetic resin. The seat portion base body 43A is formed in a substantially cylindrical shape. An outward flange portion 45A is formed such that its first axial end portion protrudes radially outward. The seat portion base body 43A is inserted into the seat block retaining portion 41A in such a manner that its first axial end portion contacts a bottom portion 74 of the seat block retaining portion 41A. The seat portion base body 43A is disposed in such a manner that the piston 28 is pressed thereon and the valve body element 46 can press the seat portion base body 43A. The outward flange portion 45A is disposed on the first axial direction X1 side. The valve body element 46 cooperates with the seat portion base body 43A to form the orifice 47 of a substantially circularly annular shape. The seat portion base body 43A is retained such that a clearance between the outer peripheral portion of the outward flange portion 45A and the inner peripheral portion of the seat block retaining portion 41A is sealed. The axis of the seat portion base body 43A substantially conforms to the reference axis L1. The inner peripheral portion of the seat portion base body 43A and the inner peripheral portion of the supply portion 69 are substantially coplanar with each other. A valve hole 57A formed by the inner peripheral portion of the seat portion base body 43A is connected to the supply passage 56A.

The fixing member 26A is formed in a substantially cylindrical shape. A male thread is formed on an intermediate axial portion of the fixing member 20A, and is threadedly engaged with the fixing member threaded engagement concave portion 40A. The axis of the fixing member 26A substantially conforms to the reference axis L1. A first end portion 49A of the fixing member 26A on the first axial direction X1 side contacts the seat block retaining portion 41A. The bottom portion 36 of the piston 28 is inserted into the fixing member 26A. The inner peripheral portion of the fixing member 26A and the outer peripheral portion of the bottom portion 36 of the piston 28 are radially spaced apart from each other. An insertion hole 71 formed by the inner peripheral portion of the fixing member 26A is connected to the valve hole 57A and to the pressure-reducing valve space 58. The insertion hole 71 has a primary-pressure chamber 62 formed to be located radially inward of the orifice 47 and a secondary region 63A formed to be located radially outward of the orifice 47 via the orifice 47. The secondary region 63A is connected to the pressure-reducing valve space 58 and forms a secondary-pressure chamber 68A together with the pressure-reducing valve space 58, the piston passage 60 and the space 38. A second axial end portion 72 of the seat portion base body 43A protrudes in the second axial direction X2 from the seat block retaining portion 41A and is fitted to the fixing member 26A. The fixing member 26A, the outward flange portion 45A, and the seat block retaining portion 41A define a spring accommodating space 50A of a substantially circularly annular shape.

The spring receiver portion 44A is formed in a substantially circularly annular shape. The spring receiver portion 44A is disposed in the spring accommodating space 50A. The spring receiver portion 44A is externally fitted to the seat portion base body 43A, and its outer peripheral portion contacts the seat block retaining portion 41A. A surface portion 73 of the spring receiver portion 44A on the first axial direction X1 side contacts the outward flange portion 45A of the seat portion base body 43A. The spring member 23 includes the first seat portion 53, the second seat portion 54, and the inclined portion 55. The spring member 23 is accommodated in the spring accommodating space 50A so as to be elastically deformable. The first seat portion 53 contacts the fixing member 26A, and its inner peripheral portion is externally fitted to the seat portion base body 43A. The second seat portion 54 contacts the spring receiver portion 44A. The spring member 23 applies a spring force to the seat portion base body 43A via the spring receiver portion 44A and cooperates with the bottom portion 74 of the seat block retaining portion 41A to retain the seat portion base body 43A between them. The axes of the spring receiver portion 44A and the spring member 23 substantially conform to the reference axis L1. The valve passage 66A includes the supply passage 56A, the valve hole 57A, the insertion hole 71, the pressure-reducing valve space 58 and the output passage 59. The housing 67A includes the pressure-reducing housing 27, the seat block housing 25A, and the fixing member 26A.

Hereinafter, the operation of the valve device 22A constructed above will be described. As in the valve device 22A of the first embodiment, the fluid is supplied from the primary port 64 which is an opening configured outward in the supply passage 56A, the pressure of the fluid is reduced by being flowed in the orifice 47, and the fluid flows to the secondary-pressure chamber 68A and is output from the secondary port 65 through the output passage 59.

Hereinbelow, effects provided by the seat block 21A and the valve device 22A will be described. In accordance with the seat block 21A of this embodiment, the seat portion base body 43A is retained between the spring member 23 and the bottom portion 74 of the seat block retaining portion 25 under the spring force being applied from the spring member 23 in the first axial direction X1. Therefore, displacement of the seat portion base body 43A with respect to the seat block retaining portion 41A which may be caused by the pressing force of the piston 28 can be suppressed, and a change in the position of the piston 28 with respect to the seat portion base body 43A can be suppressed. This makes it possible to suppress degradation of the fitted state between the valve body element 46 and the seat portion base body 43A.

In accordance with the seat block 21A of this embodiment, the effects similar to those of the seat block 21 of the first embodiment are obtained. In accordance with the valve device 22A of this embodiment, the effects similar to those of the valve device 22 of the first embodiment are obtained.

Figure 5:
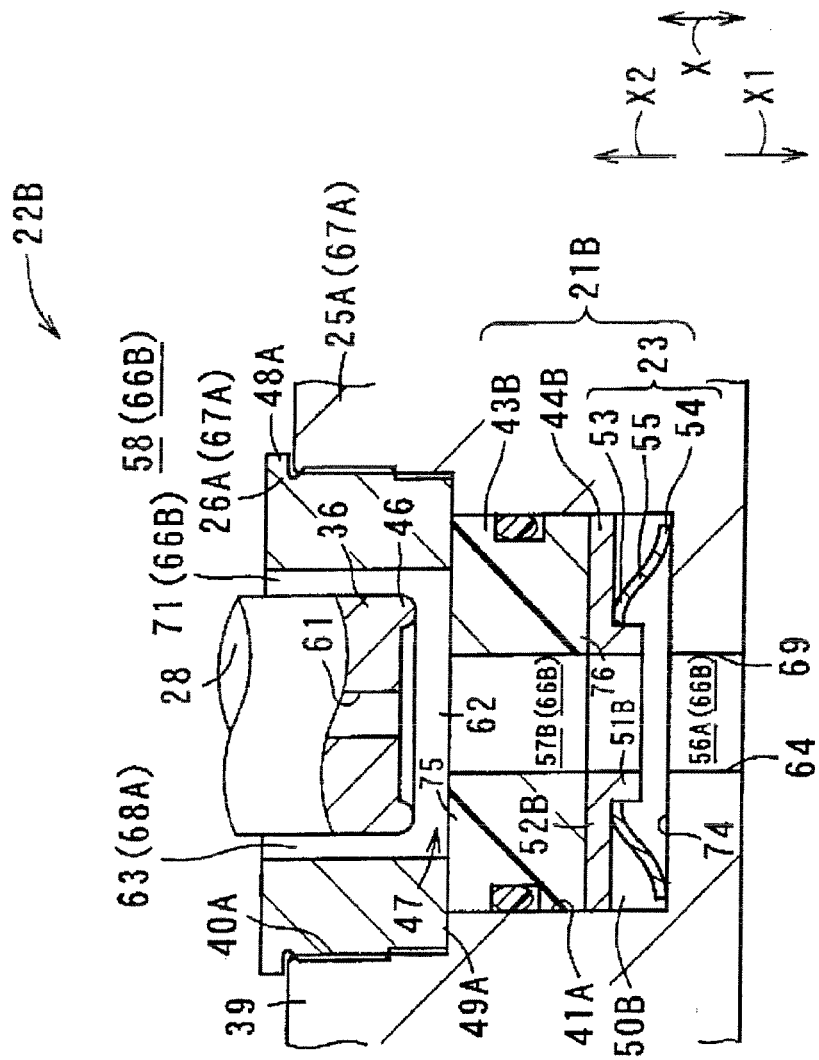
FIG. 5 is an enlarged cross-sectional view of a seat block 21B according to a third embodiment of the present invention.

FIG. 5 is an enlarged cross-sectional view of a seat block 21B according to a third embodiment of the present invention. The valve device 22B of the third embodiment includes the pressure-reducing valve portion 24, the seat block housing 25A, the seat block 21B, and the fixing member 26A. The valve device 22B is similar in structure to the valve device 22A of the second embodiment. Therefore, a distinction between the valve device 22B of the third embodiment and the valve device 22A of the second embodiment will be described with reference to FIG. 1. In the valve device 22B of the third embodiment, the same components as those of the valve device 22A are denoted by the same reference numbers and will not be further described.

The seat block 21B includes a seat portion base body 43B, a spring receiver portion 44B, and the spring member 23. The seat portion base body 43B is made of, for example, rubber or synthetic resin. The seat portion base body 43B is formed in a substantially cylindrical shape. The seat portion base body 43B is inserted into the seat block retaining portion 41A and is disposed to be spaced apart in the second axial direction X2 from the bottom portion 74 of the seat block retaining portion 41A. A spring accommodating space 50B of a substantially cylindrical hole shape is formed between the seat portion base body 43B and the bottom portion 74 of the seat block retaining portion 41A. The fixing member 26A into which the piston 28 is inserted is threadedly engaged with the fixing member threaded engagement concave portion 40A. The seat portion base body 43B contacts the fixing member 26A with which the first axial end portion 75 thereof is threadedly engaged. The seat portion base body 43B is disposed in such a manner that the piston 28 can be pressed thereon and the valve body element 46 can be pressed on the seat portion base body 43B. The valve body element 46 cooperates with the first axial end portion 75 of the seat portion base body 43B to form the orifice 47 of substantially circularly annular shape. The axis of the seat portion base body 43B substantially conforms to the reference axis L1. The seat portion base body 43B is retained in such a manner that its outer peripheral portion is sealed. The inner peripheral portion of the seat portion base body 43B and the inner peripheral portion of the supply portion 69 are substantially coplanar with each other.

The spring receiver portion 44B is formed in a substantially circularly annular shape. A spring insertion element 51B is formed at the inner peripheral edge of the spring receiver portion 44B so as to protrude in the first axial direction X1 over an entire circumference thereof. The spring receiver portion 44B is disposed in the spring accommodating space 50B and its outer peripheral portion is inserted to be internally fitted to the seat block retaining portion 41A. The spring insertion element 51B is spaced apart in the second axial direction X2 from the bottom portion 74 of the seat block retaining portion 41A. The axis of the spring receiver portion 44B substantially conforms to the reference axis L1. A surface portion 52B of the spring receiver portion 44B on the second axial direction X2 side contacts the second axial end portion 76 of the seat portion base body 43B. The inner peripheral portion of the spring receiver portion 44B is substantially coplanar with the inner peripheral portion of the seat portion base body 43B and the inner peripheral portion of the supply portion 69. The valve hole 57B is formed by the inner peripheral portion of the seat portion base body 43B and the inner peripheral portion of the spring receiver portion 44B, and is connected to the supply passage 56A through the spring accommodating space 50B. The valve hole 57B is connected to the insertion hole 71.

The spring member 23 includes the first seat portion 53, the second seat portion 54, and the inclined portion 55. The spring member 23 is accommodated in the spring accommodating space 50B to be elastically deformable. The first seat portion 53 contacts the spring receiver portion 44B and the inner peripheral portion of the first seat portion 53 is externally fitted to the spring insertion element 51B. The second seat portion 54 contacts the bottom portion 74 of the seat block retaining portion 41B. The spring member 23 which is compressed by a flexure amount x from a free length H is accommodated in the spring accommodating space 50B, and applies to the seat portion base body 43B a spring force F in the second axial direction X2 via the spring receiver portion 44B. The spring member 23 applies this force and cooperates with the fixing member 26A to retain the seat portion base body 43B between them. The spring member 23 is accommodated in the spring accommodating space 50B so as to apply the spring force F larger than the pressing force applied from the piston 28 and from the fluid to the seat portion base body 43B. The axes of the spring receiver portion 44b and the spring member 23 substantially conform to the reference axis L1. The valve passage 66B includes a supply passage 56A, a valve hole 57B, the insertion hole 71, the pressure-reducing valve space 58, and the output passage 59.

Hereinafter, the operation of the valve device 22B will be described. As in the valve device 22A of the second embodiment, the valve device 22B reduces the pressure of the fluid supplied from the primary port 64 which is an opening configured to open outward in the supply passage 56A by flowing it through the orifice 47, causes the fluid to flow to the secondary-pressure chamber 68A, and causes the fluid to output from the secondary port 65 through the output passage 59.

Hereinbelow, effects provided by the seat block 21B and the valve device 22B of this embodiment will be described. In accordance with the seat block 21B of this embodiment, the seat portion base body 43B is provided between the fixing member 26A and the spring receiver portion 44B.

In accordance with the seat block 21B of this embodiment, the effects provided by the seat block 21 of the first embodiment are obtained. In accordance with the valve device 22B of this embodiment, the effects provided by the valve device 22 of the first embodiment are obtained.

Figure 6:
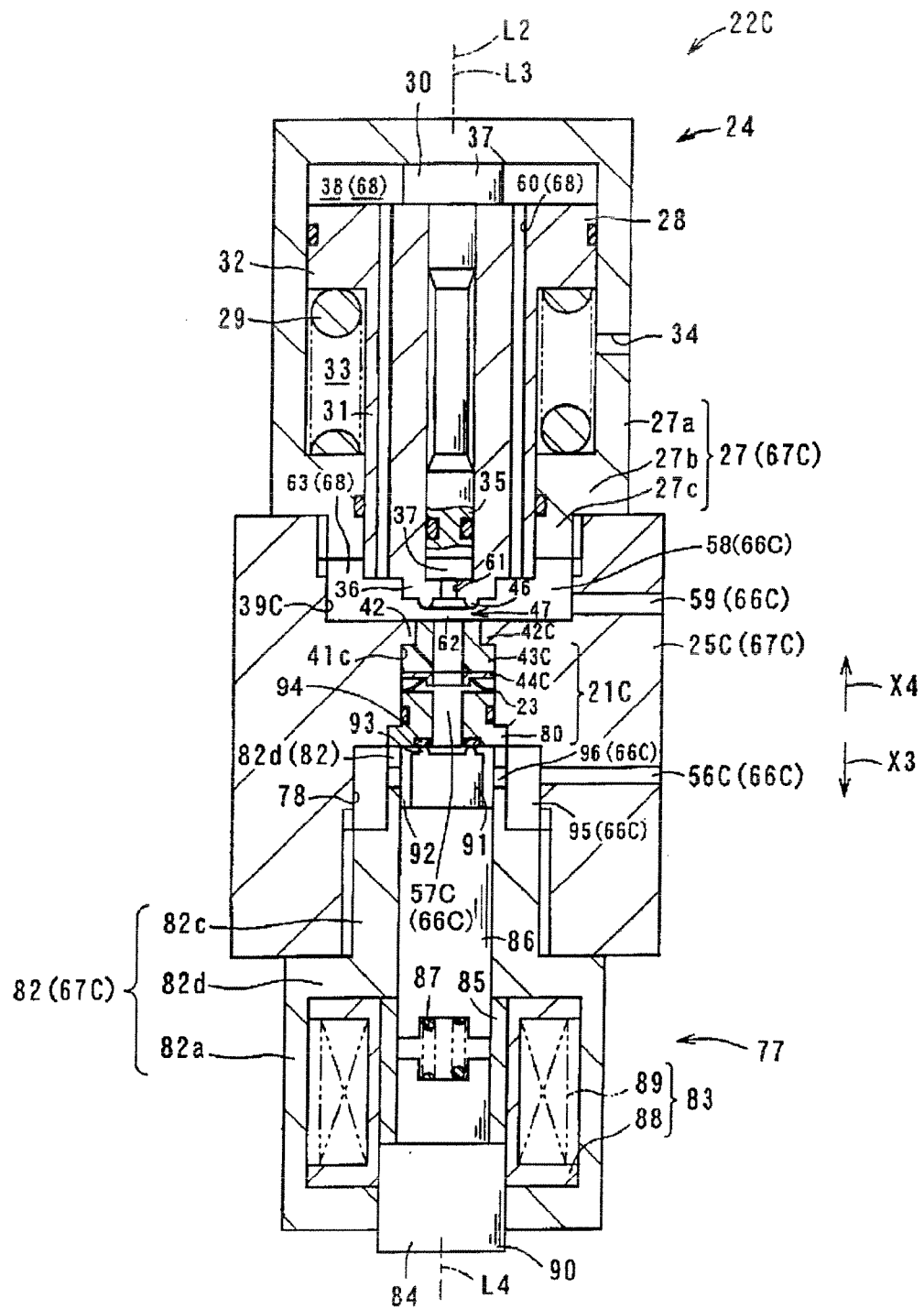
FIG. 6 is a cross-sectional view of a valve device 22C including a seat block 21C according to a fourth embodiment of the present invention.
Figure 7:
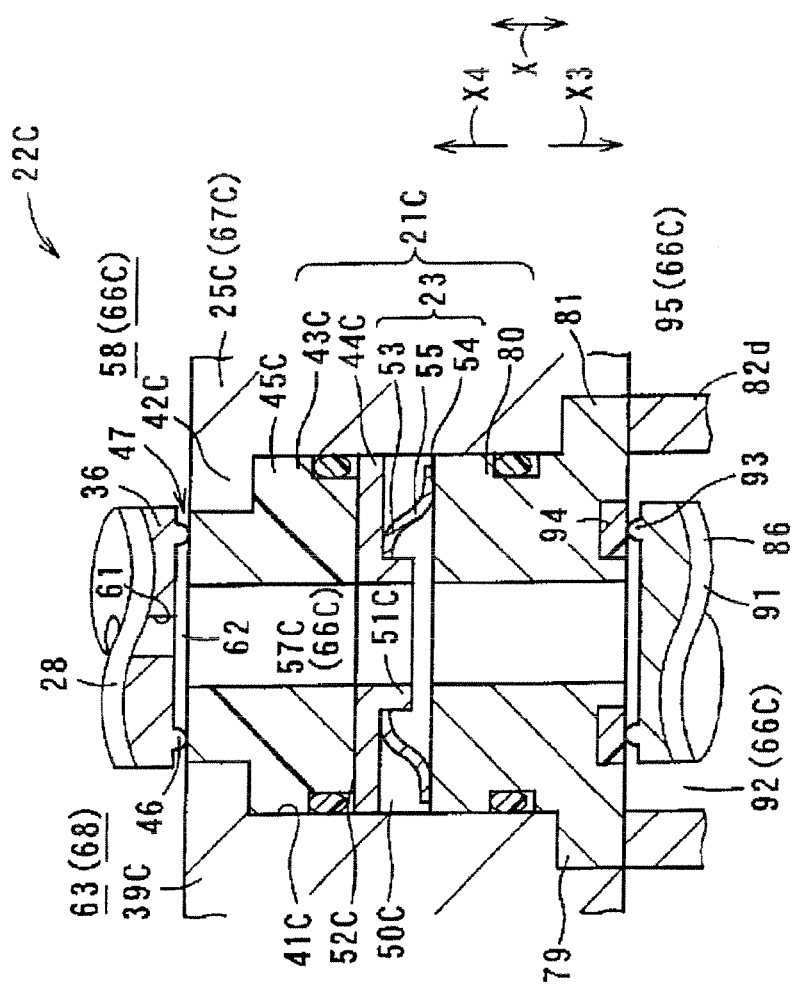
FIG. 7 is an enlarged cross-sectional view of the seat block 21C according to the fourth embodiment of the present invention.

FIG. 6 is a cross-sectional view of a valve device 22C including a seat block 21C according to a fourth embodiment of the present invention. FIG. 7 is an enlarged cross-sectional view of the seat block 21C according to the fourth embodiment of the present invention. The valve device 22C is provided in the flow passage so as to control the output of the fluid such as the gas supplied such that it reduces the pressure of the fluid supplied and outputs the fluid. The valve device 22C includes the pressure-reducing valve portion 24, the seat block housing 25C, the seat block 21C, and an on-off valve portion 77. The valve device 22C is constituted along a predetermined reference axis L2. One direction parallel to the reference axis L2 is referred to as a first axial direction X3 and an opposite direction parallel to the reference axis L2 is referred to as a second axial direction X4.

The pressure-reducing valve portion 24 reduces the pressure of the fluid supplied and outputs the fluid. The pressure-reducing valve portion 24 is identical in structure to the pressure-reducing valve portion 24 of the valve device 22 of the first embodiment. Therefore, in the pressure-reducing valve portion 24, the same components are denoted by the same reference numbers and will not be further described. The pressure-reducing portion 24 is constituted along a predetermined reference axis L3, and is disposed in such a manner that the axis L3 substantially conforms to the reference axis L2. In the pressure-reducing valve portion 24, the first axial direction X1 substantially conforms to the axial direction X3 and the second axial direction X2 substantially conforms to the axial direction X4.

The seat block housing 25C is provided with a pressure-reducing valve portion threaded engagement concave portion 39C, an-off valve portion threaded engagement concave portion 78, and a seat block retaining portion 41C. The pressure-reducing valve portion threaded engagement concave portion 39C is formed at a region of the seat block housing 25C on the second axial direction X4 side and opens in the second axial direction X4. The pressure-reducing valve portion threaded engagement concave portion 39C is formed to extend along the reference axis L2. A female thread is formed on an inner peripheral region of the pressure-reducing valve portion threaded engagement concave portion 39C, and the opening end portion 27c is threadedly engaged with the female thread. The on-off valve threaded engagement concave portion 78 is formed at a region of the seat block housing 25C on the first axial direction X3 side and opens in the first axial direction X3. The on-off valve portion threaded engagement concave portion 78 is formed to extend along the reference axis L2. A female thread is formed on an inner peripheral region of the on-off valve portion threaded engagement concave portion 78. The seat block retaining portion 41 connects the pressure-reducing valve portion threaded engagement concave portion 39C to the on-off valve threaded engagement concave portion 78.

The seat block retaining portion 41C is formed to extend along the reference axis L2. The seat block retaining portion 41C has a diameter smaller than those of the pressure-reducing valve portion threaded engagement concave portion 39C and the on-off valve portion threaded engagement concave portion 78. An inward flange portion 42C is formed at the seat block retaining portion 41C to restrict displacement of the seat block 21C in the second axial direction X4. The inward flange portion 42C is formed on an opening on the second axial direction X4 side to protrude radially inward over an entire circumference. An engagement concave portion 79 is formed at an opening of the seat block retaining portion 41C on the first axial direction X3 side over an entire circumference thereof to be recessed radially outward. The engagement concave portion 79 opens in the first axial direction X3.

The seat block 21C includes a seat portion base body 43C, a seat block body 80, a spring receiver portion 44B, and the spring member 23. The seat portion base body 43C is made of, for example, rubber or synthetic resin. The seat portion base body 43C is formed in a substantially cylindrical shape. An outward flange portion 45C is formed at a first axial end portion of the seat portion base body 43C to protrude radially outward. The seat portion base body 43C is inserted into the seat block retaining portion 41C such that the outward flange portion 45C contacts the inward flange portion 42C, and is disposed so that the piston 28 can be pressed thereon. The outward flange portion 45C is disposed on the first axial direction X3 side. The seat portion base body 43C is retained in a state where a clearance between the outer peripheral portion of the outward flange portion 45C and the inner peripheral portion of the seat block retaining portion 41C is sealed. The axis of the seat portion base body 43C substantially conforms to the reference axis L2. The valve body element 46 presses the seat portion base body 43C over a circumference thereof in a state where the piston 28 is pressed on the seat portion base body 43C. The valve body element 46 cooperates with the seat portion base body 43C to form the orifice 47 of a substantially circularly annular shape.

The seat block body 80 is formed in a substantially cylindrical shape. An outward flange portion 81 is formed at a first axial end portion of the seat block body 80 so as to protrude radially outward over an entire circumference thereof. The seat block body 80 is inserted into the seat block retaining portion 41C such that the outward flange portion 81 is engaged with the engagement concave portion 79. The outward flange portion 81 is disposed on the first axial direction X3 side. The seat block body 80 is disposed to be spaced apart in the first axial direction X3 from the seat portion base body 43C. The seat block body 80 is retained in a state where its outer peripheral portion 80 and the inner peripheral portion of the seat block retaining portion 41C are sealed. The axis of the seat block body 80 substantially conforms to the reference axis L2. The seat block body 80, the seat portion base body 43C and the seat block retaining portion 41C define a spring accommodating space 50C of a substantially cylindrical hole shape.

The spring receiver portion 44C is formed in a substantially circularly annular shape. A spring insertion element 51C is formed at the inner edge of the spring receiver portion 44C to protrude in the first axial direction X3 over an entire circumference thereof. The spring receiver portion 44C is disposed in the spring accommodating space 50C, and its outer peripheral portion is inserted to be internally fitted to the seat block retaining portion 41C. The axis of the spring receiver portion 44C substantially conforms to the reference axis L2. A surface portion 52C of the spring receiver portion 44C on the second axial direction X4 side contacts the outward flange portion 45C of the seat portion base body 43C.

The spring member 23, which is an elastic mechanism, includes the first seat portion 53, the second seat portion 54, and the inclined portion 55. The spring member 23 has a structure identical to that of the spring member 23 included in the seat block 21 of the first embodiment, and the same components are denoted by the same reference numbers and will not be further described. The spring member 23 is accommodated in the spring accommodating space 50C so as to be elastically deformable. The first seat portion 53 contacts the spring receiver portion 44C and its inner peripheral portion is externally fitted to the spring insertion element 51C. The second seat portion 54 contacts the seat block body 80. The axis of the spring member 23 substantially conforms to the reference axis L2. The spring member 23 is accommodated to be compressed by the flexure amount x from the free length H and applies the spring force F to the seat portion base body 43C in the second axial direction X4 via the spring receiver portion 44. The spring member 23 applies this spring force and cooperates with the inward flange portion 42C to retain the seat portion base body 43C between them. The spring member 23 is accommodated in the spring accommodating space 50C and applies a spring force F larger than a pressing force applied from the piston 28 and from the fluid to the seat portion base body 43C. The spring insertion element 51C of the spring receiver portion 44C is disposed to be spaced apart from the seat block body 80 to permit displacement of the spring receiver portion 44C in the first axial direction X3 and in the second axial direction X4 (hereinafter referred to as axial direction X) and deformation of the spring member 23. The inner peripheral portion of the seat portion base body 43C, the inner peripheral portion of the spring receiver portion 44C, and the inner peripheral portion of the seat block body 80 form the valve hole 57C.

The on-off valve portion 77 includes an on-off valve housing 82, a coil 83, a fixed magnetic member 84, a non-magnetic member 85, a plunger 86, and an on-off valve spring member 87. The on-off valve portion 77 is constituted along a predetermined reference axis L4 which substantially conforms to the reference axis L2 of the valve device 22C. The axes of the on-off valve housing 82, the coil 83, the non-magnetic member 85, the fixed magnetic member 84, the plunger 86, and the on-off valve spring member 87 substantially conform to the reference axis L2 of the on-off valve portion 77. The on-off valve housing 82 includes a first on-off valve housing portion 82a, an inward flange 82b, a second on-off valve housing portion 82c, and a third on-off housing portion 82d. The first on-off housing portion 82a is formed in a substantially bottomed cylindrical shape. The first on-off housing portion 82a is disposed such that its bottom portion is located on the first axial direction X3 side and its opening is located on the second axial direction X4 side. An inward flange 82b is formed on the opening of the first on-off valve housing portion 82a to protrude radially inward over an entire circumference. The second on-off housing portion 82c of a substantially cylindrical shape is formed on the inner peripheral edge of the inward flange portion 82b so as to extend in a direction away from the first on-off housing portion 82a, i.e., in the second axial direction X4.

A male thread is formed on the outer peripheral region of the second on-off valve housing portion 82c and is threadedly engaged with the on-off valve portion threaded engagement concave portion 78. A third on-off valve housing portion 82d of a substantially cylindrical shape is formed on the inner peripheral edge of the second on-off valve housing portion 82c so as to extend in the direction away from the inward flange 82b, i.e., in the second axial direction X4. The third on-off valve housing portion 82d presses the outward flange portion 81 of the seat block body 80 in a state where the second on-off valve housing portion 82c is threadedly engaged. The third on-off valve housing portion 82d cooperates with the engagement concave portion 79 to retain the outward flange portion 81 of the seat block body 80 between them.

The coil 83 includes a substantially cylindrical coil bobbin 88 made of a ferromagnetic material, and a magnet wire 89 wound around the coil bobbin 88. The coil bobbin 88 is disposed in the first on-off valve housing portion 82a. The coil bobbin 88 is disposed in such a manner that its first axial end portion contacts with the bottom portion of the first on-off valve housing portion 82a and its second axial end portion contacts the inward flange 82b.

The fixed magnetic member 84 is formed in a substantially cylindrical shape. An outward flange 90 is formed at an end portion of the fixed magnetic member 84 on the first axial direction X3 side so as to extend over an entire circumference thereof. A large part of the fixed magnetic member 84 is inserted into the coil bobbin 88. A part of the outward flange portion 90 is inserted into and fixedly mounted to the bottom portion of the first on-off valve housing portion 82a. A part of the outer peripheral portion of the outward flange 90 contacts the inner peripheral portion of the coil bobbin 88. The non-magnetic member 85 is made of a non-magnetic material and is formed in a substantially cylindrical shape. The non-magnetic member 85 is provided between a region of the fixed magnetic member 84 except the outward flange 90 and the inner peripheral portion of the coil bobbin 88. A first axial end portion of the non-magnetic member 85 contacts the outward flange 90 and a second axial end portion thereof contacts the inward flange 82b. The non-magnetic member 85 is substantially coplanar with the inner peripheral portion of the second on-off housing portion 82c.

The plunger 86 is made of a ferromagnetic material and is formed in a substantially cylindrical shape. A first axial end portion 91 of the plunger 86 has a diameter smaller than that of the remaining portion. The plunger 86 is retained on the inner peripheral portion of the second on-off valve housing portion 82c and the non-magnetic member 85 so as to be slidable in the axial direction X. The first axial end portion 91 of the plunger 86 protrudes in the second axial direction X4 from the second on-off valve housing portion 82c and is positioned inward of the third on-off valve housing portion 82d. The outer peripheral region of the first axial end portion 91 of the plunger 86 and the inner peripheral region of the third on-off valve housing portion 82d are positioned to be spaced apart radially outward from each other, and a housing space 92 of a circularly annular shape is formed between them. An on-off valve body element 93 of a substantially circularly annular shape is formed at the plunger 86 so as to protrude in the second axial direction X4 from a first axial end portion thereof. A seat member 94 of a substantially circularly annular shape is formed on the seat block body 80. The seat member 94 surrounds the opening which opens the valve hole 57C in the first axial direction X3. The seat member 94 is disposed in such a manner that the on-off valve body element 93 can press it and the plunger 98 can be pressed thereon.

An on-off valve spring member 87 is disposed between the plunger 86 and the fixed magnetic member 84 and applies a spring force in the second axial direction X4 to the plunger 86. When a driving current flows in the magnet wire 89, the coil 83 applies to the plunger 86 an electromagnetic force against the spring force applied from the on-off valve spring member 87, causing the plunger 86 to slide. The plunger 86 is pressed on the seat member 94 by the spring force in a state where the driving current does not flow in the coil 83 and is away from the seat member 94 by the electromagnetic force when the driving current flows in the coil 83.

When the on-off valve portion 77 is threadedly engaged, an on-off valve space 95 of substantially circularly annular shape which is defined by the third on-off valve housing portion 82d and the seat block housing 25C is formed inside the on-off valve portion threaded engagement concave portion 78. A supply passage 56C is formed if the seat block housing 25C to connect the on-off valve space 59 to outside. An on-off valve passage 96 is formed in the third on-off valve housing portion 82d to connect the on-off valve space 95 to the housing space 92. The output passage 59 is formed in the seat block housing 25C to connect the pressure-reducing valve space 58 to outside. In the valve device 22C, the supply passage 56C, the on-off valve space 95, the on-off valve passage 96, the housing space 92, the valve hole 57C, the pressure-reducing valve space 58 and the output passage 59 form a valve passage 66C. In this embodiment, the housing 67C includes the pressure-reducing valve housing 27, the seat block housing 25C, and the on-off valve housing 82.

Hereinafter, the operation of the valve device 22C thus constituted will be described. In the on-off valve portion 77, when the driving current flows in the coil 83, the plunger 86 which is pressed on the seat member 94 to close the valve passage 66C is displaced in the first axial direction X3, causing the valve passage 66C to be opened. When the driving current flows in the coil 83, the fluid supplied to the supply passage 56C flows into the valve hole 57C through the on-off valve space 95, the on-off valve passage 96, and the housing space 92. Furthermore, the fluid flows from the valve hole 57C into the primary-pressure chamber 62. As in the first embodiment, the pressure of the fluid flowing in the primary-pressure chamber 62 is reduced by being flowed in the orifice 47, and the fluid flows to the secondary-pressure chamber 68 and is then output from the output passage 59. When the driving current flowing in the coil 83 is cut off, the plunger 86 is pressed on the seat member 94, and closes the valve passage 66C to inhibit the flow of the fluid.

Hereinafter, the effects provided by the seat block 21C and the valve device 22C will be described. In accordance with the seat block 21C of this embodiment, a plurality of valve bodies, in this embodiment, the piston 28 and the plunger 86 can be pressed thereon. Therefore, the seat block 21C can be used in the valve device 22C equipped with the piston 28 and the plunger 86. It is not necessary to provide the seat block 21C for each of the piston 28 and the plunger 86, and thus the number of components can be reduced. This makes it possible to reduce a manufacturing cost of the seat block 21C.

In accordance with the seat block 21C, since the seat block body 80 is retained between the third on-off valve housing portion 82d and the seat block housing 25C, the structure of the seat block body 80 is simple and mounting of the seat block body 80 is easy. This makes it possible to reduce the number of manufacturing steps of the seat block 21C and thus reduce the manufacturing cost of the seat block 21C.

In accordance with the seat block 21C of this embodiment, the effects provided by the seat block 21 of the first embodiment are obtained. In accordance with the valve device 22C of this embodiment, the effects provided by the valve device 22 of the first embodiment are obtained.

Figure 8:
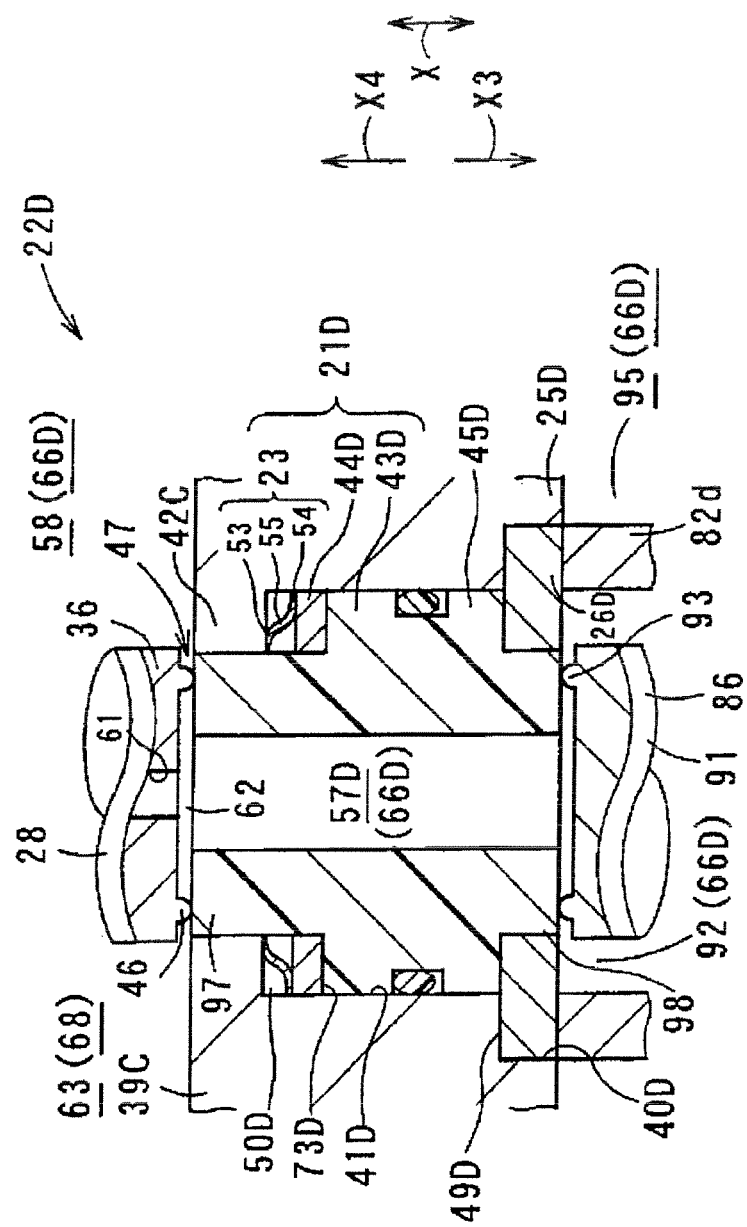
FIG. 8 is an enlarged cross-sectional view of a seat block 21D according to a fifth embodiment of the present invention.

FIG. 8 is an enlarged cross-sectional view of a seat block 21D according to a fifth embodiment of the present invention. A valve device 22D of the fifth embodiment includes the pressure-reducing valve portion 24, a seat block housing 25D, a seat block 21D, a fixing member 26D, and an on-off valve portion 77. The valve device 22D is similar in structure to the valve device 22C of the fourth embodiment. Therefore, with reference to FIG. 6, a distinction between the valve device 22D of the fifth embodiment and the valve device 22C of the fourth embodiment will be described. In the valve device 22D, the same components as those of the valve device 22C are denoted by the same reference numbers and will not be described.

The seat block housing 25D is provided with a pressure-reducing valve portion threaded engagement concave portion 39C, an on-off valve portion threaded engagement concave portion 78, a seat block retaining portion 41D, an inward flange portion 42C, and a fixing member retaining concave portion 40D. The seat block retaining portion 41D is formed to extend along the reference axis L2. The seat block retaining portion 41D has a diameter smaller than that of the pressure-reducing valve portion threaded engagement portion 39C. An inward flange portion 42C is formed on an opening of the seat block retaining portion 41D on the second axial direction X4 side so as to protrude radially inward over an entire circumference thereof. A fixing member retaining concave portion 40D is formed on an opening of a second end portion of the seat block retaining portion 41D on the first axial direction X3 side so as to be recessed radially outward over an entire circumference thereof. The fixing member retaining concave portion 40D opens in the first axial direction X3. The seat block housing 25D is provided with a supply passage 56C connecting the on-off valve space 95 to outside and the output passage 59 connecting the pressure-reducing valve space 58 to outside.

The seat block 21D includes a seat portion base body 43D, a spring receiver portion 44D, and the spring member 23. The seat portion base body 43D is made of, for example, rubber or synthetic resin. The seat portion base body 43D is formed in a substantially cylindrical shape. An outward flange portion 45D is formed at an intermediate axial end portion of the seat portion base body 43D so as to protrude radially outward. The seat portion base body 43D is inserted into the seat block retaining portion 41D. The seat portion base body 43D is disposed in such a manner that the piston 28 can be pressed on the end portion 97 on the second axial direction X4 side and the plunger 86 can be pressed on the end portion 98 on the first axial direction X3 side. The seat portion base body 43D is retained in a state where a clearance between the outer peripheral region of the outward flange portion 45D and the inner peripheral region of the seat block retaining portion 41D is sealed. The outward flange portion 45D is positioned to be spaced apart in the first axial direction X3 from the inward flange portion 42C. A spring accommodating space 50D of a substantially circularly annular shape which is defined by the seat portion base body 43D and the seat block housing 25D is formed between the outward flange portion 45D and the inward flange portion 42C. The axis of the seat portion base body 43D substantially conforms to the reference axis L2. The inner peripheral portion of the seat portion base body 43D forms a valve hole 57D.

The valve body element 46 presses the seat portion base body 43D over an entire circumference thereof in a state where the piston 28 is pressed on the seat portion base body 43D. The valve body element 46 cooperates with the seat portion base body 43D to form the orifice 47 of a substantially circularly annular shape. The on-off valve body element 93 presses the seat portion base body 43D over an entire circumference in a state where the plunger 86 is pressed on the seat portion base body 43D so as to close the valve passage 66D. The valve passage 66D includes the supply passage 56C, the on-off valve space 95, the on-off valve passage 96, the housing space 92, the valve hole 57D, the pressure-reducing valve space 58, and the output passage 59.

The fixing member 26D is formed in a substantially circularly annular shape. The fixing member 26D is inserted into the fixing member retaining concave portion 40D. The fixing member 26D is retained between the third on-off valve housing portion 82d and the seat block retaining portion 41D. An end portion 98 of the seat portion base body 43D on the first axial direction X3 side is inserted into the inner peripheral portion of the fixing member 26D. A surface portion 49D of the fixing member 26D on the second axial direction X4 side contacts the outward flange portion 45D.

The spring receiver portion 44D is formed in a substantially circularly annular shape. The spring receiver portion 44D is disposed in the spring accommodating space 50D and its outer peripheral portion is inserted to be internally fitted to the seat block retaining portion 41D. The seat portion base body 43D is inserted into the inner peripheral portion of the spring receiver portion 44D. A surface portion 73D of the spring receiver portion 44D on the first axial direction X3 side contacts the outward flange portion 45D. The axis of the spring receiver portion 44D substantially conforms to the reference axis L2.

The spring member 23, which is an elastic member, includes the first seat portion 53, the second seat portion 54, and the inclined portion 55. The spring member 23 is accommodated in the spring accommodating space 50D so as to be elastically deformable. The first seat portion 53 contacts the inward flange portion 42C, and the seat portion base body 43D is inserted into the inner peripheral portion of the first seat portion 53. The second seat portion 54 contacts the outward flange portion 45D. The axis of spring member 23 substantially conforms to the reference axis L2. The spring member 23 which is compressed by a flexure amount x from a free length H is accommodated in the spring accommodating space 50D, and applies to the seat portion base body 43D a spring force F in the first axial direction X3 via the spring receiver portion 44D. The spring member 23 applies this force and cooperates with the fixing member 26D to retain the seat portion base body 43D between them. The spring member 23 is accommodated in the spring accommodating space 50 and applies the spring force F larger than a pressing force applied from the plunger 86 and from the fluid to the seat portion base body 43D.

The housing 67D includes the pressure-reducing valve housing 27, the seat block housing 25D, the on-off valve housing 82, and the fixing member 26D.

Hereinafter, the operation of the valve device 22D will be described. As in the valve device 22C of the fourth embodiment, when the driving current flows in the coil 83, the fluid supplied to the supply passage 56C flows into the primary-pressure chamber 62 through the on-off valve space 95, the on-off passage 96, the housing space 92, and the valve hole 57D. The pressure of the fluid flowing in the primary-pressure chamber 62 is reduced by being flowed in the orifice 47, and the fluid flows to the secondary-pressure chamber 68 and is then output from the output passage 59. When the driving current flowing in the coil 83 is cut off, the plunger 86 is pressed on the seat portion base body 43D, and closes the valve passage 66D to inhibit the flow of the fluid.

Hereinbelow, the effects provided by the seat block 21D and the valve device 22D will be described. In accordance with the seat block 21D of this embodiment, the spring member 23 applies to the seat portion base body 43D a spring force larger than the pressing force applied from the plunger 86 and from the fluid to the seat portion base body 43D. This makes it possible to suppress relative displacement of the seat portion base body 43D which may be caused by the pressing force applied from the plunger 86 and from the fluid. Therefore, a change in the position of the plunger 86 with respect to the seat portion base body 43D can be suppressed and degradation of fitted state of the plunger 86 with respect to the seat portion base body 43D can be suppressed. By suppressing degradation of the fitted state, the valve passage 66D can be surely closed.

In accordance with the seat block 21D of this embodiment, since the seat portion base body 43D contacts the fixing member 26D, relative displacement of the seat portion base body 43D in the first axial direction X3 is inhibited. This makes it possible to suppress relative displacement of the seat portion base body 43D which may be caused by the pressing force applied from the piston 28 and from the fluid. Therefore, a change in the position of the piston 28 with respect to the seat portion base body 43D can be suppressed and degradation of the fitted state of the piston 28 with respect to the seat portion base body 43D can be suppressed. By suppressing degradation of the fitted state, it becomes possible to suppress the flow of the fluid from the primary-pressure chamber 62 to the secondary-pressure chamber 68, in a state where the valve passage 66D is closed.

In accordance with the seat block 21D of this embodiment, the seat portion base body 43D is inserted and the fixing member 26D is retained between the third on-off valve housing portion 82d and the seat block retaining portion 41D. Thereby, mounting of the seat block 21D is accomplished. Therefore, mounting of the seat block 21D is easy and the number of manufacturing steps can be reduced.

In accordance with the seat block 21D of this embodiment, the effects provided by the seat block 21C of the fourth embodiment are obtained. In accordance with the valve device 22D of this embodiment, the effects provided by the valve device 22C of the fourth embodiment are obtained.

Figure 9:
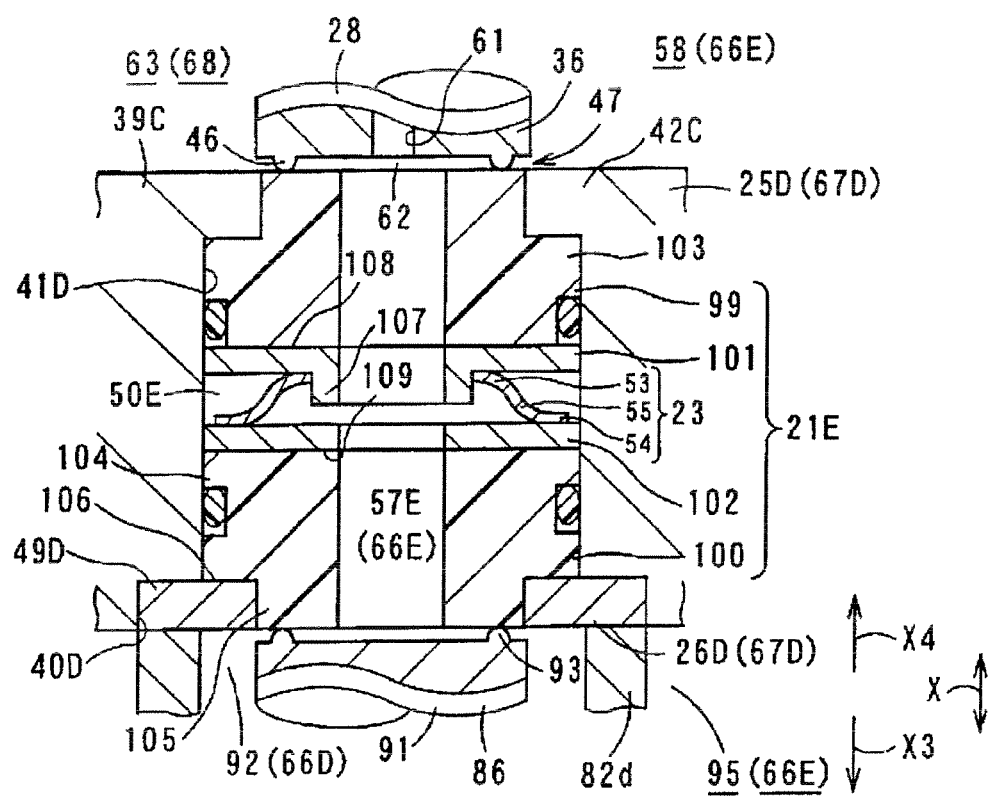
FIG. 9 is an enlarged cross-sectional view of a seat block 21E according to a sixth embodiment of the present invention.
Figure 10:
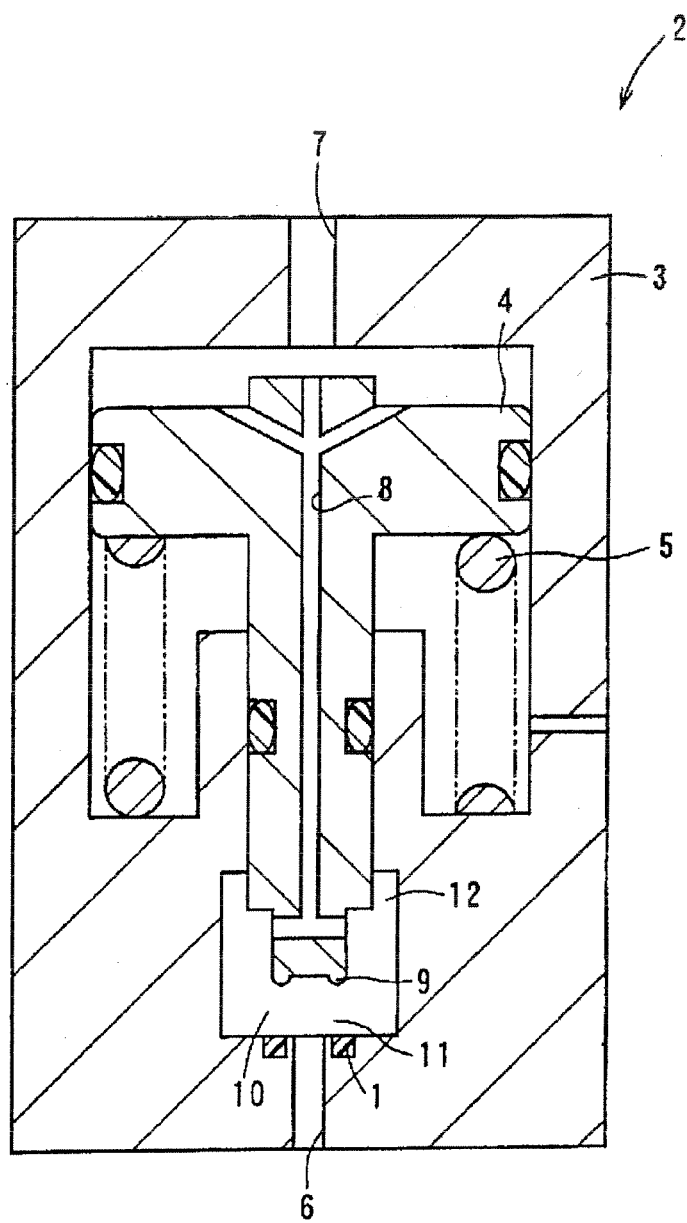
FIG. 10 is a cross-sectional view showing a pressure-reducing valve 2 including a seat portion 1 according to a first prior art.
Figure 11:
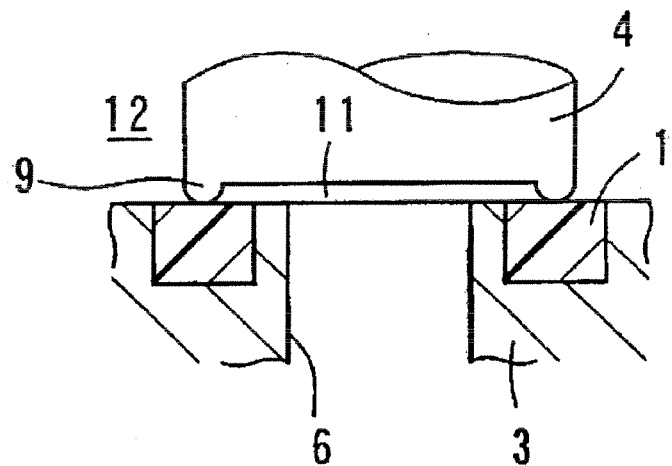
FIG. 11 is an enlarged cross-sectional view of a seat portion 1.
Figure 12:
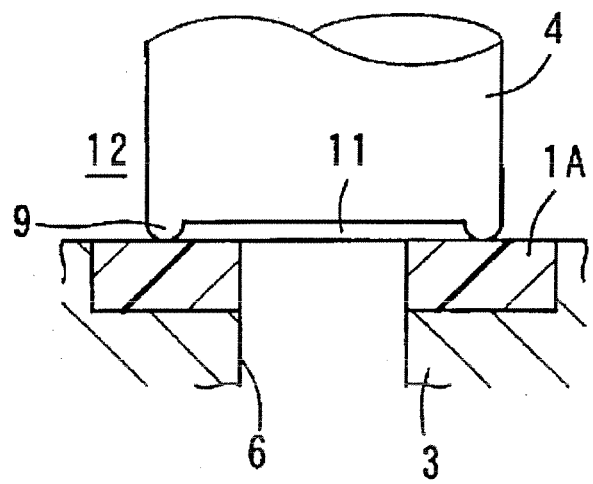
FIG. 12 is an enlarged cross-sectional view of a seat portion 1 according to a second prior art.
Figure 13:
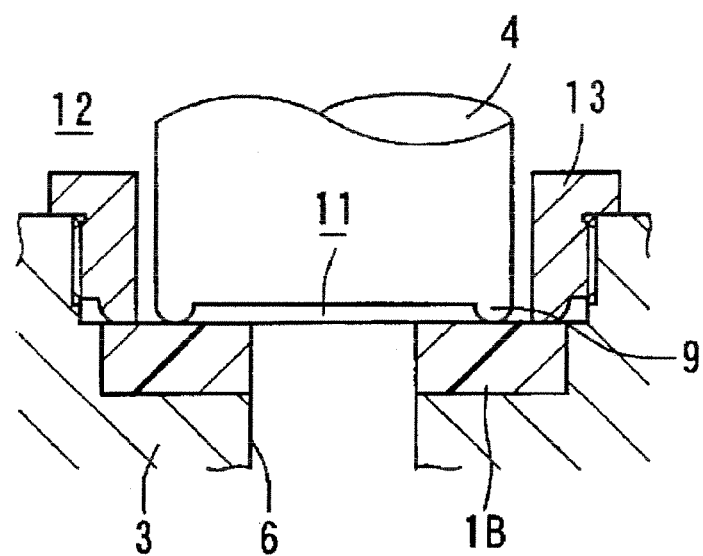
FIG. 13 is an enlarged cross-sectional view of a seat portion 1 according to a third prior art.

FIG. 9 is an enlarged cross-sectional view of a seat block 21E according to a sixth embodiment of the present invention. A valve device 22E of the sixth embodiment includes the pressure-reducing valve portion 24, the seat block housing 25D, the seat block 21E, the fixing member 26D, and the on-off valve portion 77. The valve device 22E is similar in structure to the valve device 22D of the fourth embodiment. Therefore, with reference to FIGS. 6 and 8, a distinction between the valve device 22D of the fifth embodiment and the valve device 22E of the sixth embodiment will be described. In the valve device 22E, the same components as those of the valve device 22D are denoted by the same reference numbers and will not be described.

The seat block 21E includes a first seat portion base body 99, a second seat portion base body 100, a first spring receiver portion 101, a second spring receiver portion 102, and the spring member 23. The first seat portion base body 99 is made of, for example, rubber or synthetic resin. The first seat portion base body 99 is formed in a substantially cylindrical shape. A first outward flange portion 103 is formed at a first axial end portion of the first seat portion base body 99 so as to protrude radially outward. The first seat portion base body 99 is inserted into the seat block retaining portion 41D such that the first outward flange portion 103 contacts the inward flange portion 42C and is disposed so that the piston 28 can be pressed thereon. The first outward flange portion 103 is disposed on the first axial direction X3 side. The first seat portion base body 99 is retained in such a manner that a clearance between the outer peripheral region of the first outward flange portion 103 and the inner peripheral region of the seat block retaining portion 41D is sealed. The axis of the first seat portion base body 99 substantially conforms to the reference axis L2. The valve body element 46 presses the first seat portion base body 99 over a circumference thereof in a state where the piston 28 is pressed on the first seat portion base body 99. The valve body element 46 cooperates with the first seat portion base body 99 to form the orifice 47 of a substantially circularly annular shape.

The second seat portion base body 100 is formed in a substantially cylindrical shape. A second outward flange portion 104 is formed at a first axial end portion thereof so as to protrude radially outward. The second seat portion base body 100 is inserted into the seat block retaining portion 41D such that the second outward flange portion 104 is positioned on the second axial direction X4 side and is disposed so that the plunger 86 can be pressed thereon. The second seat portion base body 100 is retained in a state where a clearance between the outer peripheral region of the second outward flange portion 104 and the inner peripheral region of the seat block retaining portion 41D is sealed. The axis of the second seat portion base body 100 substantially conforms to the reference axis L2. The on-off valve body element 93 presses the second seat portion base body 100 over an entire circumference thereof in a state where the plunger 86 is pressed on the second seat portion base body 100. The first seat portion base body 99 and the second seat portion base body 100 are spaced apart from each other in the axial direction X. A spring accommodating space 50E of a substantially cylindrical hole shape is formed between the first seat portion base body 99 and the second seat portion base body 100.

The fixing member 26D is formed in a substantially circularly annular shape. The fixing member 26D is inserted into a fixing member retaining concave portion 40D. The fixing member 26D is retained between the third on-off valve housing portion 82d and the seat block retaining portion 41D. An end portion 105 of the second seat portion base body 100 on the first axial direction X3 side is inserted into the inner peripheral portion of the fixing member 26D. A surface portion 106 of the fixing member 26D on the second axial direction X4 side contacts the second outward flange portion 104.

The first spring receiver portion 101 is formed in a substantially circularly annular shape. A spring insertion element 107 is formed at the inner peripheral edge of the first spring receiver portion 101 so as to protrude in the first axial direction X3 over an entire circumference thereof. The first spring receiver portion 101 is disposed in the spring accommodating space 50E and its outer peripheral portion is inserted to be internally fitted to the seat block retaining portion 41D. The axis of the first spring receiver portion 101 substantially conforms to the reference axis L2. A surface portion 108 of the first spring receiver portion 101 on the second axial direction X4 side contacts the first outward flange portion 103. The second spring receiver portion 102 is formed in a substantially circularly annular shape. The second spring receiver portion 102 is disposed in the spring accommodating space 50E and its outer peripheral portion is inserted to be internally fitted to the seat block retaining portion 41D. The axis of the second spring receiver portion 102 substantially conforms to the reference axis L2. A surface portion 109 of the second spring receiver portion 102 on the first axial direction X3 side contacts the second outward flange portion 104. The first spring receiver portion 101 and the second spring receiver portion 102 are disposed to be spaced apart from each other in the axial direction X.

The spring member 23, which is an elastic member, includes the first seat portion 53, the second seat portion 54, and the inclined portion 55. The spring member 23 is accommodated in the spring accommodating space 50E so as to be elastically deformable. The first seat portion 53 contacts the first spring receiver portion 101 and its inner peripheral portion is externally fitted to the spring insertion element 107. The second seat portion 54 contacts the second receiver portion 102. The axis of the spring member 23 substantially conforms to the reference axis L2. The spring member 23, which is compressed by a flexure amount x from a free length H, is accommodated in the spring accommodating space 50E, and applies to the first seat portion base body 99 a spring force F in the second axial direction X4 via the first spring receiver portion 101. The spring member 23 applies to the second seat portion base body 100 a spring force F in the first axial direction X3 via the second spring receiver portion 102. The spring member 23 applies this spring force F and cooperates with the inward flange portion 42C to retain the first seat portion base body 99 between them and cooperates with the fixing member 26D to retain the second seat portion base body 100 between them. The spring member 23 is accommodated in the spring accommodating space 50E and applies to the first seat portion base body 99 and to the second seat portion base body 100 the spring force F larger than the pressing force applied from the piston 28 and from the fluid to the first seat portion base body 99 and the pressing force applied from the plunger 86 and from the fluid to the second seat portion base body 100.

The inner peripheral portion of the first seat portion base body 99, the inner peripheral portion of the first spring receiver portion 101, the inner peripheral portion of the second spring receiver portion 102, and the inner peripheral portion of the second seat portion base body 100 are substantially coplanar with each other and form a valve hole 57E. The valve passage 66E includes the supply passage 56C, the on-off valve space 95, the on-off valve passage 96, the housing space 92, the valve hole 57E, the pressure-reducing valve space 58, and the output passage 59.

Hereinafter, the operation of the valve device 22E thus constituted will be described. As in the valve device 22D of the fifth embodiment, when the driving current flows in the coil 83, the fluid supplied to the supply passage 56C flows into the primary-pressure chamber 62 through the on-off valve space 95, the on-off valve passage 96, the housing space 92, and the valve hole 57E. The pressure of the fluid flowing in the primary-pressure chamber 62 is reduced by being flowed in the orifice 47, and the fluid flows to the secondary-pressure chamber 68 and is then output from the output passage 59. When the driving current flowing in the coil 83 is cut off, the plunger 86 is pressed on the second seat portion base body 100, and closes the valve passage 66E, thereby inhibiting the flow of the fluid.

Since the seat block 21E of this embodiment includes the first spring receiver portion 101 and the second spring receiver portion 102, the spring member 23 can apply a uniform surface pressure generated by the spring force to the first seat portion base body 99 and to the second seat portion base body 100. This makes it possible to suppress uneven contact of the first seat portion base body 99 and the second seat portion base body 100.

Although the spring member 23 is used as the means for applying the spring force to the seat portion base bodies 43, 43A, 43B, 43C, and 43D and to the first seat portion base body 99 and the second seat portion base body 100, the means is not intended to be limited to the spring member 23. For example, the means may be the coil 89 spring, disc spring, spring washer, wave washer, and rubber so long as it is capable of applying an elastic force to the seat portion base bodies 43, 43A, 43B, 43C, and 43D and to the first seat portion base body 99 and the second seat portion base body 100. It is necessary to set the elastic force larger than the pressing force applied from the piston 28, from the plunger 86 and from the fluid to the seat portion base bodies 43, 43A, 43B, 43C, and 43D and to the first seat portion base body 99 and the second seat portion base body 100. Furthermore, the material of the seat portion base bodies 43, 43A, 43B, 43C, and 43D, the first seat portion base body 99, the second seat portion base body 100, and the seat member 94 is not intended to be limited to resin and rubber. The seat portion base bodies 43, 43A, 43B, 43C, and 43D, the first seat portion base body 99, the second seat portion base body 100, and the seat member 94 may be made of a material which is softer than a material of the valve body element 46 and the on-off valve body element 93, for example, copper sheet material.

Whereas in this embodiment, the valve devices 22, 22A, and 22B are pressure-reducing valve devices, they are not intended to be limited to these but may be, for example, on-off valve devices so long as a valve structure is employed. Whereas the spring member 23 is such that the first seat portion 53 is positioned on the first axial direction X3 side and the second seat portion 54 is positioned on the second axial direction X4 side, positioning is not intended to be limited to this. For example, the first seat portion 53 is positioned on the second axial direction X4 side and the second seat portion 54 is positioned on the first axial direction X3 side so long as they cooperate with the housing 67 to retain the seat portion base body 43D, the first seat portion base body 99 and the second seat portion base body 100.

Whereas in this embodiment, the valve devices 22C, 22D, and 22E are each provided with the pressure-reducing valve portion and the on-off valve portion, such a structure is exemplary. For example, the valve devices 22C, 22D, and 22E may be each provided with two pressure-reducing valve portions and two on-off valve portions. The number of valve bodies provided in the valve devices 22C, 22D, and 22E may be three instead of two. Moreover, a plurality of valve passages 66C, 66D, and 66E may be provided in the valve bodies.

The spring member 23 and the spring receiver portion may be integrally formed. This makes it possible to make the surface pressure applied to the seat portion base bodies 43, 43A, 43B, 43C, and 43D more uniform. The spring member 23, the first receiver portion 101, and the second spring receiver portion 102 may be integrally formed.

Numerous modifications and alternative embodiments of the invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention and all modifications which come within the scope of the appended claims are reserved.

The invention claimed is:

1. A seat block comprising:
   a seat portion base body which is provided in a housing provided with a valve passage and allows at least one valve body for opening and closing the valve passage to be pressed on the seat portion base body; and
   an elastic mechanism for applying an elastic force to the seat portion base body such that the elastic mechanism cooperates with the housing to retain the seat portion base body;
   wherein the elastic mechanism is a spring mechanism configured to apply to the seat portion base body the elastic force against a pressing force applied from the valve body pressed on the seat portion base body or from a fluid; and
   wherein the spring mechanism is a non-linear spring mechanism which is configured to increase a load as a displacement amount of the spring mechanism increases such that an increase rate of the load decreases as the displacement amount increases; and
   wherein the non-linear spring mechanism is arranged to apply the elastic force to the seat portion base body when the spring mechanism is compressed to a state in which the increase rate of the load decreases as the displacement amount increases.

2. A valve device comprising a seat block, the seat block including:
   a seat portion base body which is provided in a housing provided with a valve passage and allows at least one valve body for opening and closing the valve passage to be pressed on the seat portion base body;
   an elastic mechanism for applying an elastic force to the seat portion base body such that the elastic mechanism cooperates with the housing to retain the seat portion base body
   wherein the elastic mechanism is a spring mechanism configured to apply to the seat portion base body the elastic force against a pressing force applied from the valve body pressed on the seat portion base body or from a fluid; and
   wherein the spring mechanism is a non-linear spring mechanism which is configured to increase a load as a displacement amount of the spring mechanism such that an increase rate of the load decreases as the displacement amount increases; and
   wherein the non-linear spring mechanism is arranged to apply the elastic force to the seat portion base body when the spring mechanism is compressed to a state in which the increase rate of the load decreases as the displacement amount increases.

3. The seat block according to claim 1, wherein the spring mechanism applies a spring force to the seat portion base body via a spring receiver member.

4. The seat block according to claim 3, wherein the spring receiver member is in surface contact with the seat portion base body.

5. The seat block according to claim 4, wherein the spring mechanism has a substantially circularly annular seat portion, and is configured to apply the spring force to the seat portion base body in a state where the seat portion is in contact with the spring receiver member.

6. The seat block according to claim 3, wherein the spring mechanism has a substantially circularly annular seat portion, and is configured to apply the spring force to the seat portion base body in a state where the seat portion is in contact with the spring receiver member.

7. A seat block comprising:
- a seat block housing having an inward flange;
- a seat portion base body disposed in the seat block housing and provided with a valve passage, the seat portion base body arranged to allow at least one valve body for opening and closing the valve passage to be pressed on the seat portion base body, the seat portion base body having an outward flange arranged to abut the inward flange of the seat block housing;
- a fixing member coupled to the seat block housing;
- a spring accommodating space defined within the seat block housing between the seat portion base body and the fixing member;
- an elastic spring member disposed within the spring accommodating space, the elastic spring member working in compression and operatively coupled to the seat portion base body and the fixing member and arranged to continuously apply a resisting load to the seat portion base body to retain the outward flange of the seat portion base body in contact with the inward flange of the seat block housing, the resisting load resisting movement of the seat portion base body from a pressing force of the valve body against the seat portion base body or from a fluid against the seat portion base body; and
- wherein the elastic spring member is a non-linear spring configured to increase the resisting load as a function of displacement of the elastic spring member, the elastic spring member arranged so that a rate of increase of the resisting load decreases as the displacement amount increases.

8. The seat block according to claim 7, wherein the elastic spring member is in contact with the fixing member.

* * * * *